United States Patent
Wada et al.

(10) Patent No.: US 11,007,839 B2
(45) Date of Patent: May 18, 2021

(54) AUTOMOTIVE COMPONENT MANUFACTURING METHOD AND AUTOMOTIVE COMPONENT

(71) Applicant: NIPPON STEEL & SUMITOMO METAL CORPORATION, Tokyo (JP)

(72) Inventors: Manabu Wada, Tokyo (JP); Yasushi Suzuki, Tokyo (JP); Noboru Hasegawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 216 days.

(21) Appl. No.: 16/082,858

(22) PCT Filed: Mar. 9, 2017

(86) PCT No.: PCT/JP2017/009547
§ 371 (c)(1),
(2) Date: Sep. 6, 2018

(87) PCT Pub. No.: WO2017/155056
PCT Pub. Date: Sep. 14, 2017

(65) Prior Publication Data
US 2019/0126714 A1     May 2, 2019

(30) Foreign Application Priority Data
Mar. 10, 2016   (JP) .............................. JP2016-046898

(51) Int. Cl.
*B21D 31/00*       (2006.01)
*B60G 21/05*       (2006.01)
(Continued)

(52) U.S. Cl.
CPC ............ *B60G 21/051* (2013.01); *B21C 37/15* (2013.01); *B21D 22/02* (2013.01); *B21D 26/043* (2013.01);
(Continued)

(58) Field of Classification Search
CPC .... B21D 22/025; B21D 53/88; B60G 21/051; B60G 2200/23; B60G 2206/202; B60G 2206/012; Y10T 29/49622
See application file for complete search history.

(56) References Cited

U.S. PATENT DOCUMENTS

| | | | |
|---|---|---|---|
| 9,156,329 B2* | 10/2015 | Peters | B60G 21/051 |
| 10,618,363 B2* | 4/2020 | Iguchi | B60G 21/051 |

(Continued)

FOREIGN PATENT DOCUMENTS

| | | |
|---|---|---|
| EP | 0873802 A1 | 10/1998 |
| JP | 2001-321846 A | 11/2001 |

(Continued)

OTHER PUBLICATIONS

Extended European Search Report for corresponding European Application No. 17763396.3, dated Nov. 11, 2019.
(Continued)

*Primary Examiner* — Toan C To
(74) *Attorney, Agent, or Firm* — Birch, Stewart, Kolasch & Birch, LLP

(57) ABSTRACT

An automotive component manufacturing method includes a molding process of pressing a portion of a hollow tube formed from a metal material, or a composite material including a metal and a resin, so as to deform the portion of the hollow tube, from a tube outer side toward a tube inner side, to beyond an axial center of the hollow tube, and mold the portion of the hollow tube into a deformed section deformed with a concave profile; and a deformation process of deforming a location having a high level of residual stress in a closed cross-section configured by the deformed section so as to deform the location out-of-plane.

20 Claims, 18 Drawing Sheets

(51) Int. Cl.
*B21C 37/15* (2006.01)
*B21D 26/043* (2011.01)
*B21D 53/88* (2006.01)
*B21D 22/02* (2006.01)
*B60G 9/04* (2006.01)
*B60G 7/00* (2006.01)

(52) U.S. Cl.
CPC .............. *B21D 53/88* (2013.01); *B60G 7/00* (2013.01); *B60G 9/04* (2013.01); *B60G 2200/21* (2013.01); *B60G 2206/012* (2013.01); *B60G 2206/0122* (2013.01); *B60G 2206/20* (2013.01); *B60G 2206/8103* (2013.01)

(56) References Cited

U.S. PATENT DOCUMENTS

| | | | |
|---|---|---|---|
| 2001/0022099 | A1 | 9/2001 | Ueno et al. |
| 2009/0277542 | A1 | 11/2009 | Nakamura et al. |
| 2010/0009114 | A1* | 1/2010 | Kim ................... B21D 53/88 |
| | | | 428/99 |
| 2010/0187788 | A1 | 7/2010 | Choi et al. |
| 2010/0301577 | A1 | 12/2010 | Toepker |
| 2012/0104717 | A1 | 5/2012 | Hashimoto et al. |
| 2013/0140785 | A1* | 6/2013 | Stranz .................. B21D 47/01 |
| | | | 280/124.166 |
| 2015/0151352 | A1 | 6/2015 | Peters et al. |

FOREIGN PATENT DOCUMENTS

| | | |
|---|---|---|
| JP | 2007-76410 A | 3/2007 |
| JP | 2008-30513 A | 2/2008 |
| JP | 2008-149343 A | 7/2008 |
| JP | 2008-169455 A | 7/2008 |
| JP | 2009-155730 A | 7/2009 |
| JP | 2010-240656 A | 10/2010 |
| JP | 2010-253552 A | 11/2010 |
| JP | 2010-537884 A | 12/2010 |
| JP | 2011-635 A | 1/2011 |
| JP | 2013-52740 A | 3/2013 |
| JP | 2013-91433 A | 5/2013 |
| JP | 2013-158802 A | 8/2013 |
| JP | 2015-523212 A | 8/2015 |
| WO | WO 2013/185212 A1 | 12/2013 |
| WO | WO 2013/185217 A1 | 12/2013 |

OTHER PUBLICATIONS

International Preliminary Report on Patentability and English translation of Written Opinion of the International Searching Authority, issued in PCT/JP2017/009547 dated Sep. 11, 2018 (Forms PCT/IB/373 and PCT/ISA/237).
Korean Office Action dated Nov. 18, 2019, issued for Korean Patent Application No. 10-2018-7025565, with English translation.
International Search Report for PCT/JP2017/009547 dated Jun. 6, 2017.
Office Action for JP 2017-545761 dated Nov. 7, 2017.
Written Opinion of the International Searching Authority for PCT/JP2017/009547(PCT/ISA/237) dated Jun. 6, 2017.

* cited by examiner

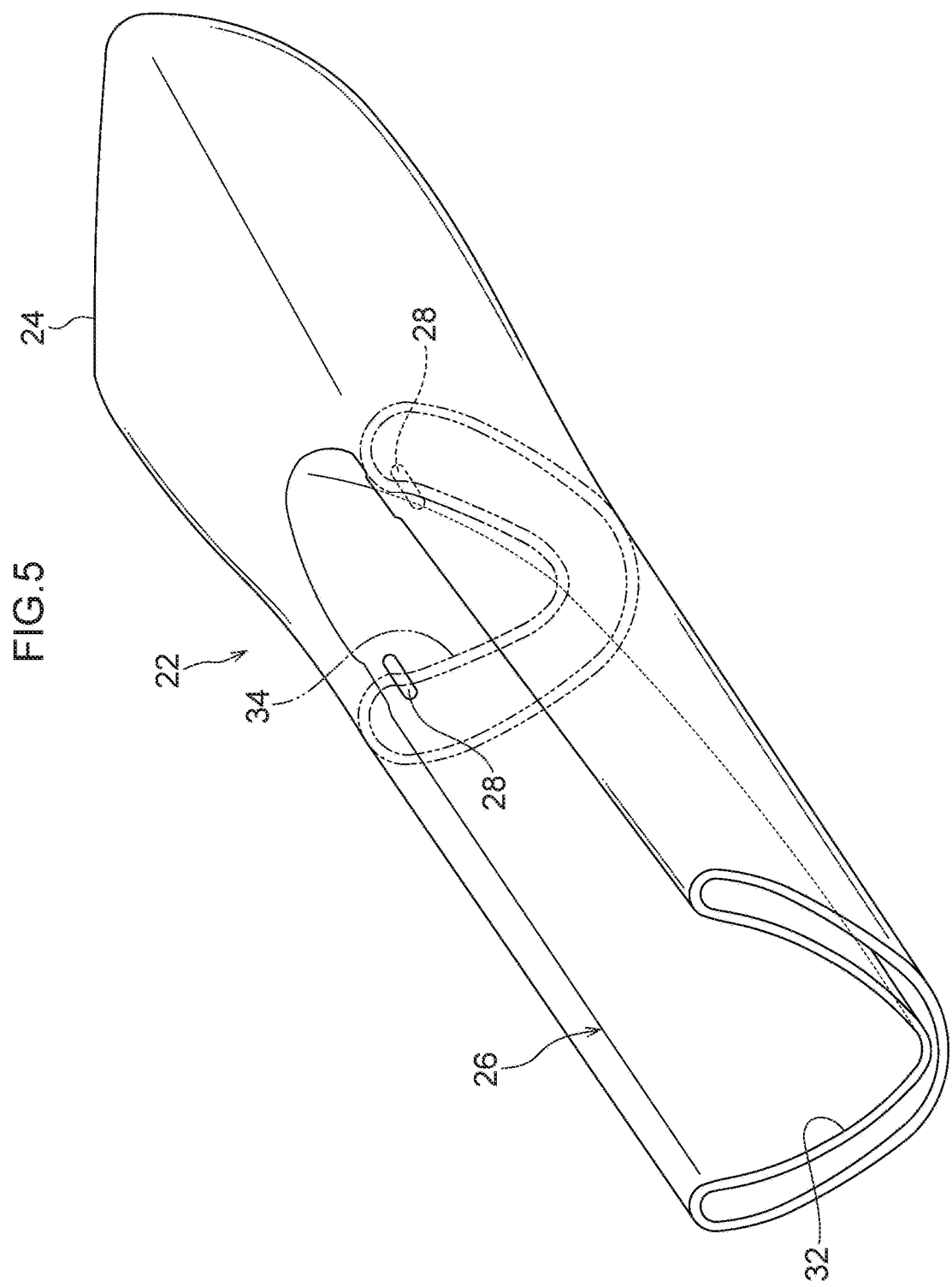

AUTOMOTIVE COMPONENT MANUFACTURING METHOD AND AUTOMOTIVE COMPONENT

TECHNICAL FIELD

The present disclosure relates to an automotive component manufacturing method and to an automotive component.

BACKGROUND ART

Pressing in which a hollow tube (tube stock) is squashed inward from the tube outer side, and plastically-formed components obtained through such pressing, are widely employed in automotive components. Explanation follows regarding an example of a torsion beam as a representative of such automotive components.

Torsion beam suspension units are configured by a torsion beam, trailing arms, and the like. Torsion beams include plate torsion beams and pipe torsion beams. In the case of pipe torsion beams, an axial direction end portions of the pipe torsion beam are provided with pipe-end joining portions that are joined to the trailing arms. Moreover, the vicinity of an axial direction center of the pipe torsion beam is provided with a torsion section molded into a V-shaped or U-shaped cross-section profile in order to secure roll stiffness of the vehicle body. Manufacturing methods for such pipe torsion beams may involve pressing so as to squash tube stock along an axial direction such that the tube stock is squashed inward from the tube outer side in order to obtain the cross-section profile of the torsion section (see, for example, Japanese Patent Application Laid-Open (JP-A) No. 2011-635).

Since torsion beams are deformed and suffer from fatigue as a result of external force received from the road surface during use, there is a need to research materials, shapes, and processes that do not suffer fatigue failure. Moreover, reductions in torsion beam weight are demanded from the perspective of improving fuel efficiency. It is therefore important to achieve both improved fatigue characteristics and a reduction in weight. To such ends, various technology has been proposed, which can be broadly split into the following four categories.

(1) Technology relating to the shape of a torsion beam, which improves fatigue characteristics by avoiding concentrations of stress and localized deformation (for example JP-A Nos. 2007-76410, 2013-52740).

(2) Technology that raises material strength by quenching after molding, in which fatigue characteristics are improved without removing residual stress (for example JP-A No. 2001-321846).

(3) Technology in which residual molding stress is removed by annealing in order to improve fatigue characteristics (employing a material that does not soften at the surface when annealed; for example JP-A No. 2009-155730).

(4) Technology relating to molding methods capable of reducing residual stress (for example JP-A No. 2013-91433).

SUMMARY OF INVENTION

Technical Problem

Of the above, the technology of (1) is limited to profiles capable of achieving both component rigidity and low weight, and is narrow in its application. The technologies of (2) and (3) require heat treatment, entailing quality control and manufacturing cost issues. Accordingly, from the perspective of cost reduction and global sourcing for torsion beams, there is demand for technology to improve fatigue characteristics without performing heat treatment. Moreover, if tensile residual stress at the tube inner surface can not only be reduced, but actually replaced with compressive residual stress, this acts to close fatigue cracking at the tube surface, thereby improving fatigue characteristics. Demand therefore exists for technology that improves fatigue characteristics by generating compressive residual stress. The inventors have thus focused on developing new technology applying the principles of (4).

In JP-A No. 2013-91433, the inventors have already developed a method to reduce tensile residual stress by molding a torsion beam and then widening a location with high residual stress. However, there is a concern that the improvement in the fatigue characteristics of the torsion beam obtained by this method may not be great enough.

In consideration of the above circumstances, an object of the present disclosure is to provide an automotive component manufacturing method capable of obtaining an automotive component in which fatigue characteristics of a deformed section are improved without performing quenching or annealing after molding; namely by reducing tensile residual stress at a tube inner face of the deformed section, and such an automotive component.

Solution to Problem

An automotive component manufacturing method of one aspect of the present disclosure includes a molding process of pressing a portion of a hollow tube formed from a metal material, or a composite material including a metal and a resin, so as to deform the portion of the hollow tube, from a tube outer side toward a tube inner side, to beyond an axial center of the hollow tube, and mold the portion of the hollow tube into a deformed section deformed with a concave profile; and a deformation process of deforming a location having a high level of residual stress in a closed cross-section configured by the deformed section so as to deform the location out-of-plane.

An automotive component of another aspect of the present disclosure includes a tubular section formed by a metal material or a composite material including a metal and a resin; a deformed section including a first deformed section provided at one axial direction side of the tubular section, wherein a portion of a peripheral wall is deformed with respect to the tubular section beyond an axial center of the tubular section from a tube outer side toward a tube inner side so as to mold the portion of the peripheral wall into a concave profile, and a second deformed section linking the tubular section to the first deformed section and having a deformation amount that gradually changes from the tubular section toward the first deformed section; and out-of-plane deformed sections that are each formed with a convex profile or a concave profile at mutually opposing portions in a closed cross-section of the second deformed section orthogonal to an axial direction of the tubular section.

Advantageous Effects of the Invention

The automotive component manufacturing method and the automotive component of the present disclosure are capable of providing an automotive component manufacturing method that can obtain an automotive component with improved fatigue characteristics of a deformed section without performing quenching or annealing after molding; namely by reducing tensile residual stress at a tube inner face of the deformed section, and such an automotive component.

BRIEF DESCRIPTION OF DRAWINGS

FIG. 5 is a vertically inverted perspective view illustrating a cross-section of the torsion beam illustrated in FIG. 1.

DESCRIPTION OF EMBODIMENTS

First Exemplary Embodiment

Figure 1:
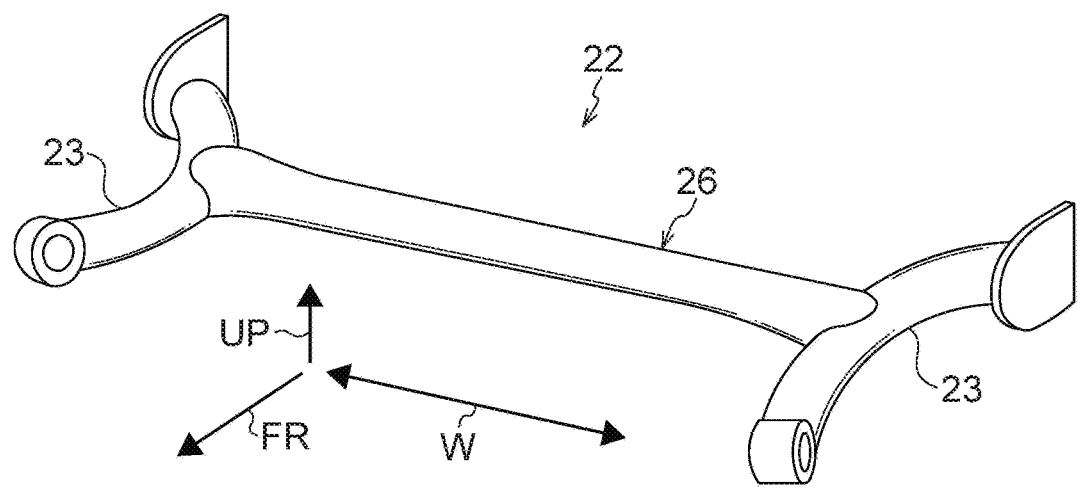
FIG. 1 is a perspective view of a torsion beam configuring an automotive component of a first exemplary embodiment.

Explanation follows regarding an automotive component manufacturing method (hereafter abbreviated to "manufacturing method" as appropriate) of a first exemplary embodiment.

First, explanation will be given regarding the automotive component manufactured using the manufacturing method of the present exemplary embodiment, followed by explanation regarding a manufacturing device employed in the manufacturing method of the present exemplary embodiment. This will then be followed by explanation regarding the manufacturing method of the present exemplary embodiment.

The automotive component manufactured by the manufacturing method of the present exemplary embodiment is a torsion beam 22 formed by pressing and hydroforming (using hydraulic pressure to mold) a hollow tube (tube stock) 20 that is configured from a metal material, or from a composite material including a metal and a resin. The torsion beam 22 is employed in an automotive suspension unit (not illustrated in the drawings), and is a component that couples together left and right trailing arms 23. Note that the automotive component manufactured using the manufacturing method of the present exemplary embodiment is not limited to a torsion beam.

Automotive Component

Figure 2:
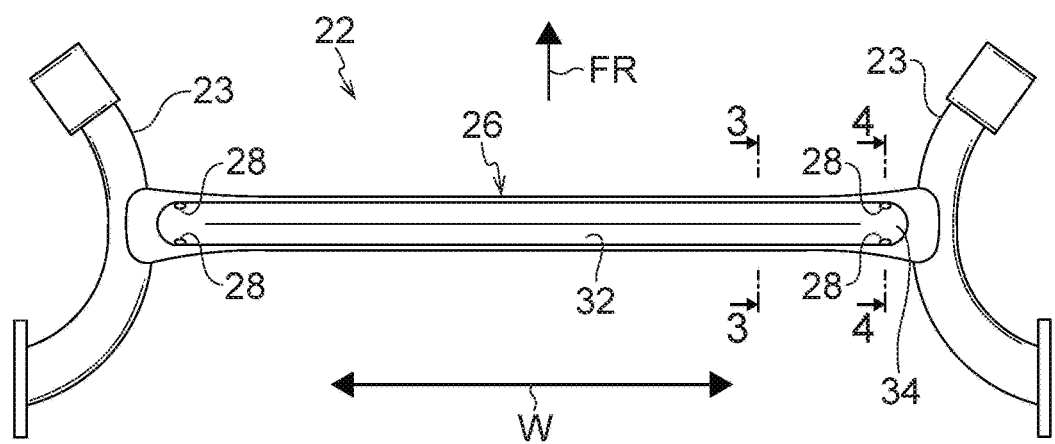
FIG. 2 is a lower face view of the torsion beam illustrated in FIG. 1, as viewed from below.

As illustrated in FIG. 1 and FIG. 2, the torsion beam 22 includes tubular sections 24 formed from a metal material or a composite material including a metal and a resin, a torsion section 26 (an example of a deformed section) provided at one axial direction side of each tubular section 24, and out-of-plane deformed sections 28 provided to second deformed sections 34 of the torsion section 26, as will be described later.

Tubular Sections 24

As illustrated in FIG. 2 and FIG. 5, the tubular sections 24 are provided at both axial direction sides of the torsion beam 22. In other words, the torsion section 26 is provided at a portion between the tubular sections 24 in an axial direction. Each tubular section 24 is configured with a substantially rectangular tube-shaped profile. The tubular sections 24 configure pipe-end joining portions to which the left and right trailing arms 23 are joined.

Torsion Section 26

As illustrated in FIG. 2, the torsion section 26 is a section of the torsion beam 22 that secures roll stiffness of a vehicle body. As will be described later, the torsion section 26 is a section formed by pressing a portion of the hollow tube 20 from a tube outer side toward a tube inner side so as to be deformed beyond an axial center CL of the tubular section 24, such that the torsion section 26 is formed on the tubular sections 24 by being deformed from the tube outer side toward the tube inner side.

The torsion section 26 further includes a first deformed section 32 (see FIG. 3) and the second deformed sections 34 (see FIG. 4) that link the first deformed section 32 and the tubular sections 24 together. The first deformed section 32 is a section at which a portion of a peripheral wall 25 is deformed with a concave profile from the tube outer side toward the tube inner side beyond the axial center CL with respect to the tubular sections 24. The first deformed section 32 has a uniform cross-section along the axial direction. Each second deformed section 34 is a section at which the deformation amount of a portion of the peripheral wall 25 from the tube outer side toward the tube inner side gradually increases on progression from the tubular sections 24 toward the first deformed section 32.

Figure 3:
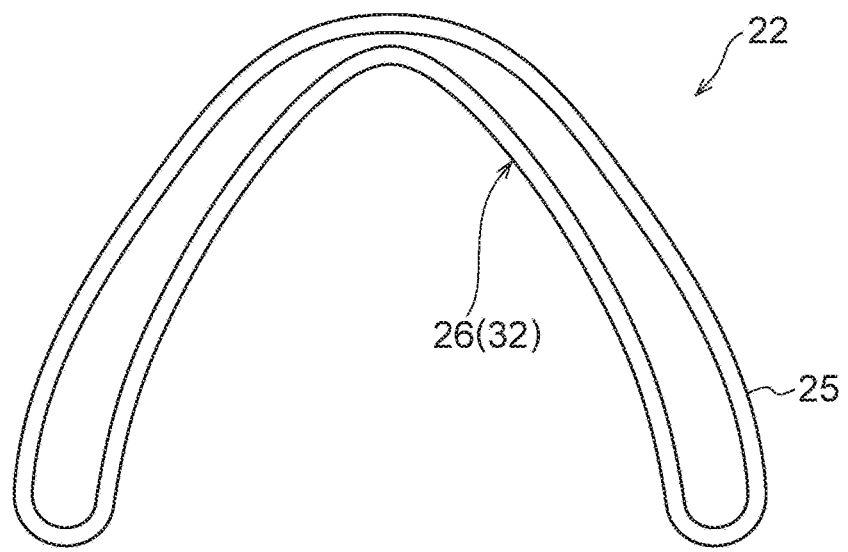
FIG. 3 is a cross-section taken along line 3-3 in FIG. 2.

In the present exemplary embodiment, as illustrated in FIG. 3, the first deformed section 32 is configured with a V-shaped closed cross-section profile. Note that the first deformed section 32 may be configured with a U-shaped or C-shaped closed cross-section profile. The cross-section profile of the torsion section 26 is formed by pressing, which will be described later.

Out-Of-Plane Deformed Sections 28

Figure 4:
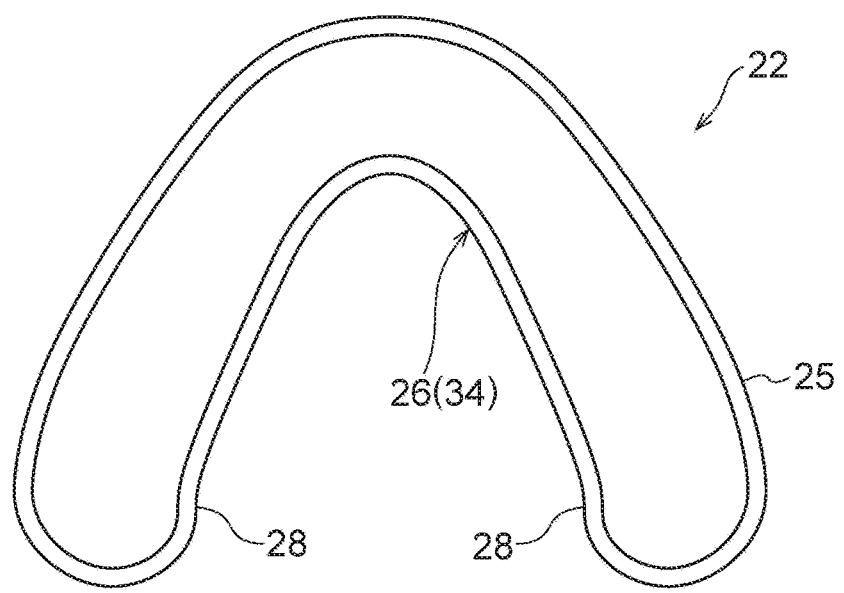
FIG. 4 is a cross-section taken along line 4-4 in FIG. 2.

As illustrated in FIG. 4 and FIG. 5, the out-of-plane deformed sections 28 are formed as mutually opposing portions, each deformed with a concave shape in a closed cross-section of the second deformed section 34 when taken orthogonally to the axial direction of the tubular section 24. Specifically, the out-of-plane deformed sections 28 are formed as mutually opposing portions in the vicinity of the ends of a V-shaped opening. The out-of-plane deformed sections 28 of the present exemplary embodiment are convex portions in which the peripheral wall 25 is deformed out-of-plane so as to protrude from the tube inner side toward the tube outer side.

Automotive Component Manufacturing Device

Next, explanation follows regarding an automotive component manufacturing device of the present exemplary embodiment.

Figure 6A:
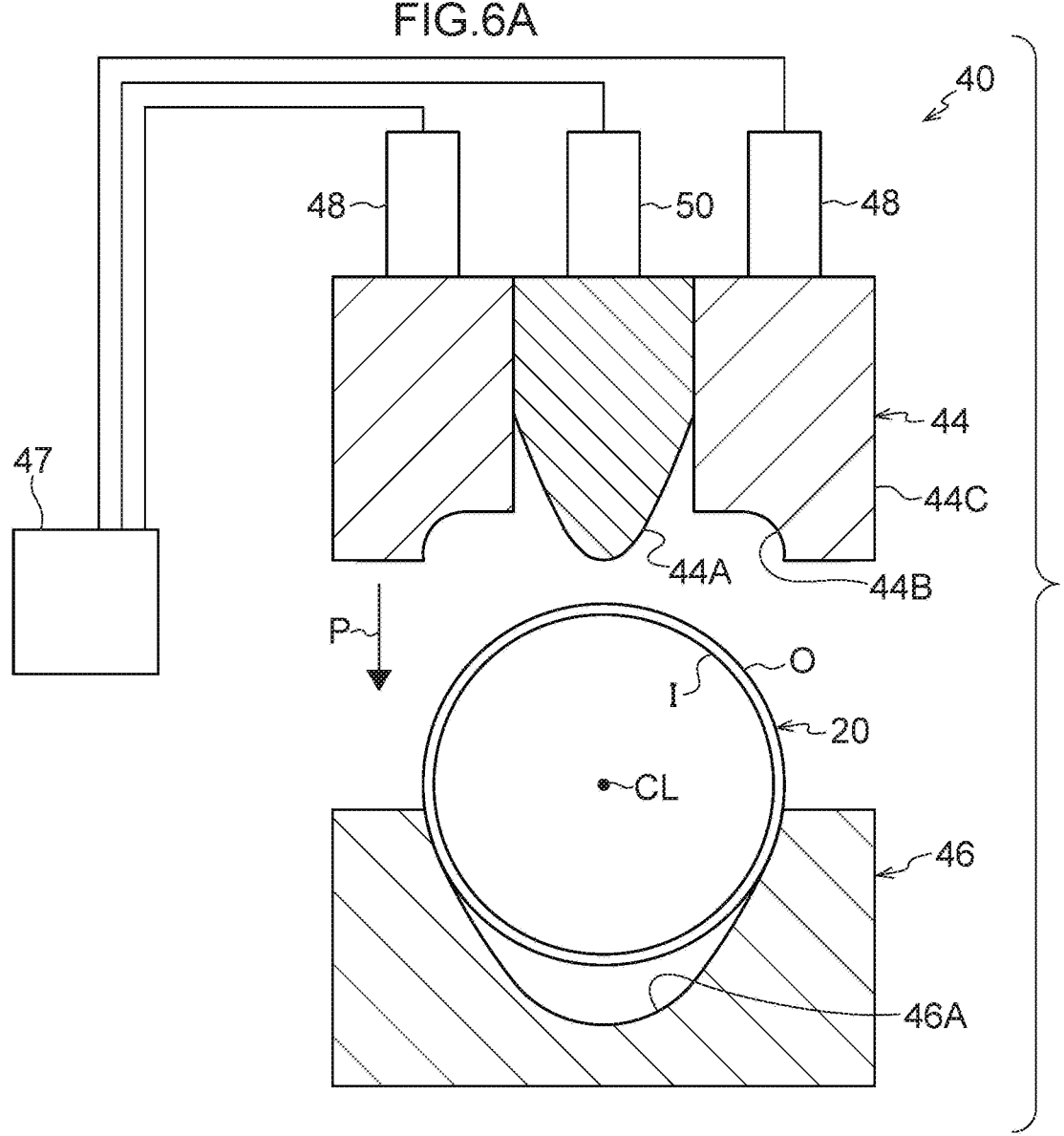
FIG. 6A is a cross-section of a die for pressing a hollow tube.
Figure 11:
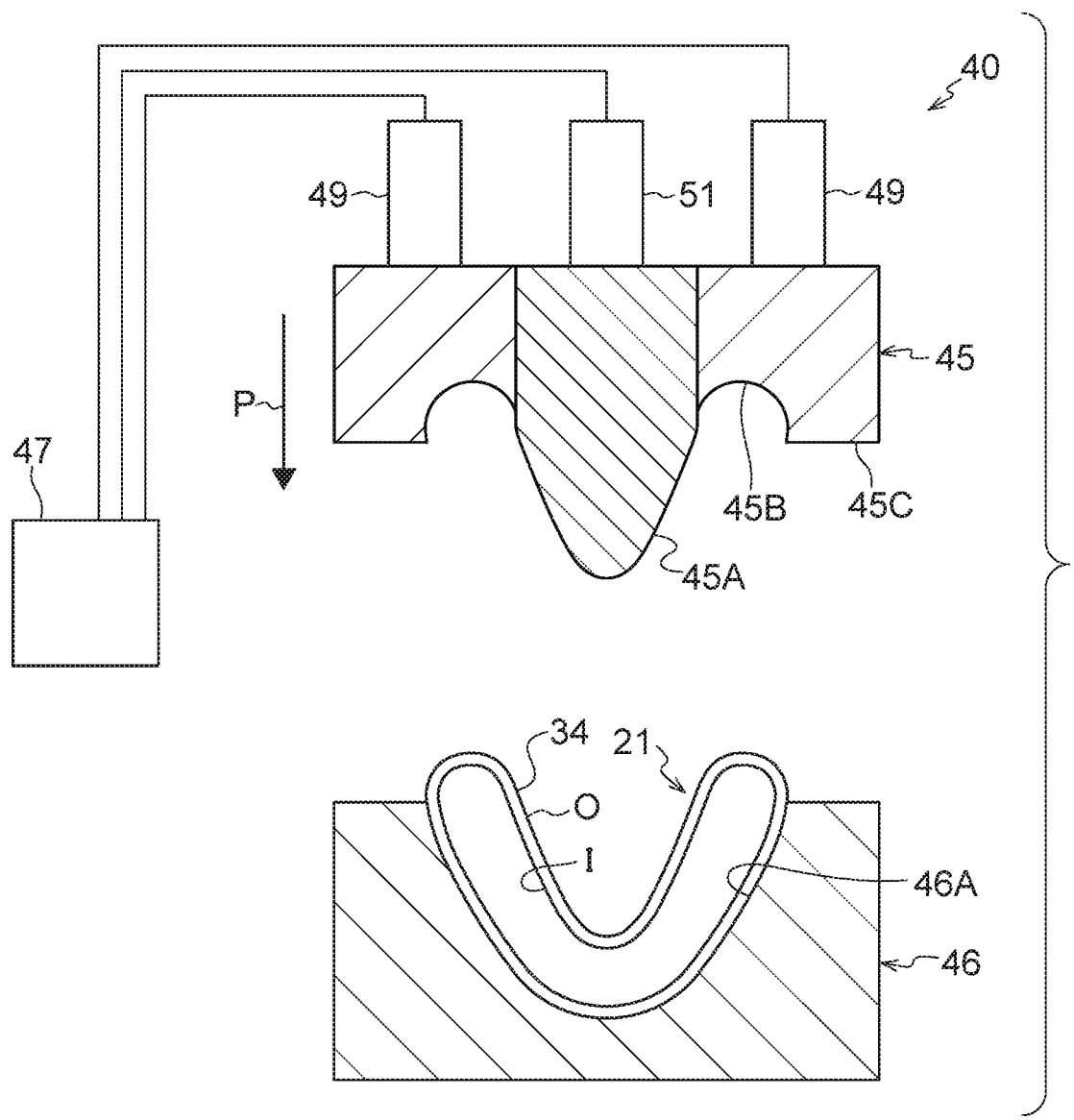
FIG. 11 is a cross-section of a die for hydroforming an intermediate molded product.

As illustrated in FIG. 6A and FIG. 11, a manufacturing device 40 is a device for pressing a hollow tube 20 to mold an intermediate molded product, and then hydroforming the intermediate molded product to mold the torsion beam 22. The manufacturing device 40 includes an upper die 44 and a lower die 46 that press a portion of the hollow tube 20 so as to mold an intermediate molded product 21.

The upper die 44 includes a pressing section 44A that presses and deforms a portion of the hollow tube 20 (a portion on the upper side in FIG. 6A and FIG. 7) from the tube outer side toward the tube inner side, and molded sections 44C that are each formed with a concave portion 44B for forming the opening ends of the V-shape of the torsion section 26. Note that although the manufacturing device 40 of the present exemplary embodiment is configured such that the upper die 44 is lowered with respect to the lower die 46 (in a pressing direction (arrow P direction) in the present exemplary embodiment), the present disclosure is not necessarily limited to such a configuration. For example, configuration may be made in which the lower die 46 is raised with respect to the upper die 44. Moreover, the pressing section 44A of the upper die 44 is capable of moving relative to the molded sections 44C in the pressing direction.

The lower die 46 is formed with a concave portion 46A for molding an apex portion 26A (a portion on the lower side in FIG. 6A and FIG. 7) of the torsion section 26.

The manufacturing device 40 includes moving devices 48 to move the upper die 44 and the lower die 46 relative to one another, and a pressing device 50 that moves the pressing section 44A in the pressing direction.

In the present exemplary embodiment, the moving devices 48 are connected to the upper die 44, and the upper die 44 is configured to move with respect to the lower die 46 (move downward in FIG. 6A). The moving devices 48 may, for example, be configured by hydraulic cylinders.

The pressing device 50 is connected to the pressing section 44A of the upper die 44, and is configured to move the pressing section 44A in the pressing direction (move downward in FIG. 4 and FIG. 5) with respect to other portions of the upper die 44. The pressing device 50 may, for example, be configured by a hydraulic device or an electrically powered device.

The manufacturing device 40 further includes an upper die 45 (see FIG. 11) that uses hydroforming to bend back portions of the intermediate molded product to mold the out-of-plane deformed sections 28.

Figure 13:
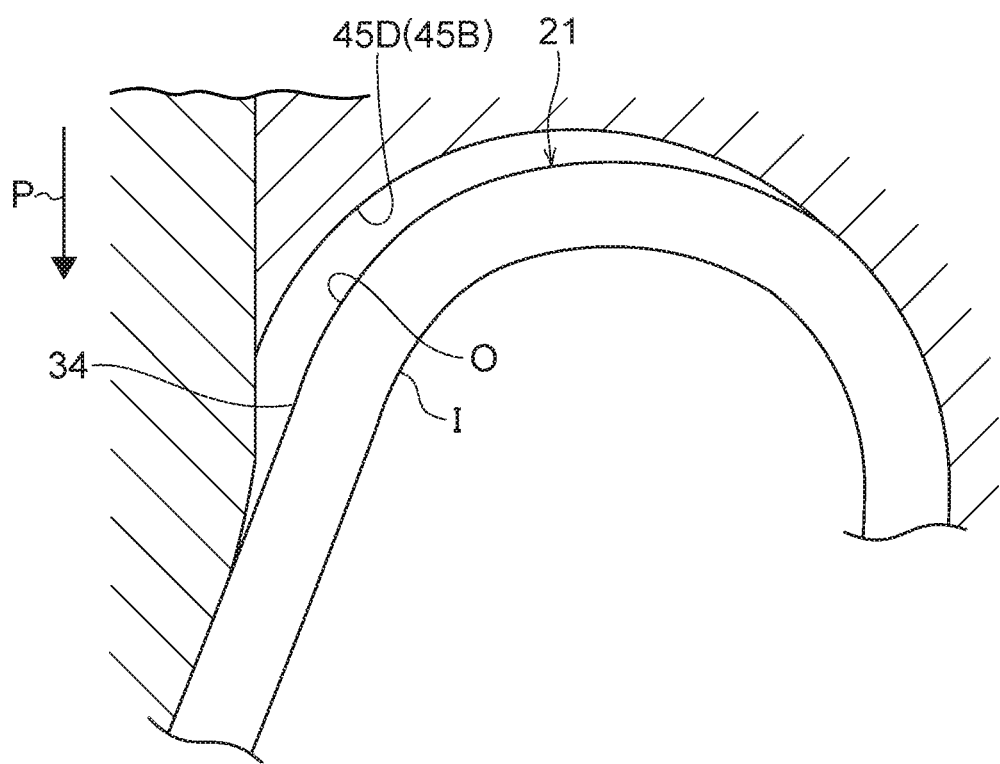
FIG. 13 is an enlarged view illustrating the portion indicated by arrow 13X in FIG. 12.

As illustrated in FIG. 11, the upper die 45 includes a pressing section 45A, concave portions 45B, and molded sections 45C, each having the same profile as the pressing section 44A, the concave portions 44B, and the molded sections 44C of the upper die 44 respectively. Each concave portion 45B is formed with a recessed portion 45D at a position corresponding to the out-of-plane deformed section 28 of the torsion section 26. Specifically, the recessed portion 45D enables the formation of a gap (see FIG. 13) between the concave portion 45B and the ends of a U-shaped opening of the second deformed section 34 in a state in which the intermediate molded product 21 is being held by the upper die 45 and the lower die 46.

The manufacturing device 40 further includes moving devices 49 that move the upper die 45 and the lower die 46 relative to one another, and a pressing device 51 that moves the pressing section 45A in the pressing direction.

The configurations of the moving devices 49 and the pressing device 51 are similar to the configurations of the moving devices 48 and the pressing device 50. The moving devices 48, 49 and the pressing devices 50, 51 are controlled by a controller 47.

The manufacturing device 40 further includes a liquid injector 52 that injects liquid into a hollow portion of each tubular section 24 in a state in which the tubular section 24 is held by the upper die 45 and the lower die 46, and a compression device 54 (see FIG. 6B) that compresses the tubular section 24 in the axial direction (what is referred to as axial compression).

The liquid injector 52 is a device that injects liquid into the hollow portion of each tubular section 24 through a pair of closing dies 53 (see FIG. 6B) that close off both axial direction ends of the intermediate molded product 21. The hydraulic pressure of the liquid from the liquid injector 52 is set high enough to cause out-of-plane deformation of the second deformed section 34. Namely, in a state in which the tubular section 24 is held by the upper die 45 and the lower die 46, portions of the second deformed section 34 are deformed out-of-plane toward the recessed portions 45D of the upper die 44 by injecting liquid into the hollow portion of the tubular section 24 with the liquid injector 52, thereby forming the out-of-plane deformed section 28.

Figure 6B:
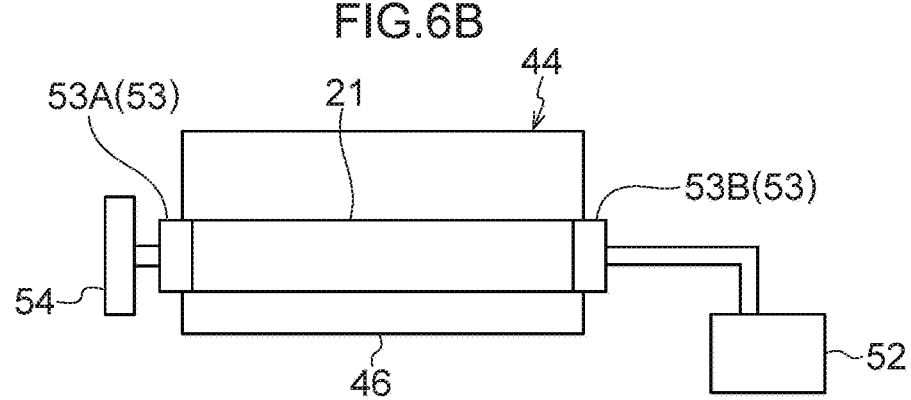
FIG. 6B is a side cross-section of a die, illustrating a state in which an intermediate molded product is being compressed along an axial direction.

As illustrated in FIG. 6B, the compression device 54 is a device that compresses the intermediate molded product by moving one (movable) closing die 53A toward another (fixed) closing die 53B in the axial direction of the intermediate molded product 21.

Automotive Component Manufacturing Method

Next, explanation follows regarding the automotive component manufacturing method of the present exemplary embodiment.

First Setting Process

First, as illustrated in FIG. 6A, the hollow tube 20 formed from a metal material or a composite material including a metal and a resin is set in the concave portion 46A of the lower die 46 of the manufacturing device 40.

Forming Process

Figure 7:
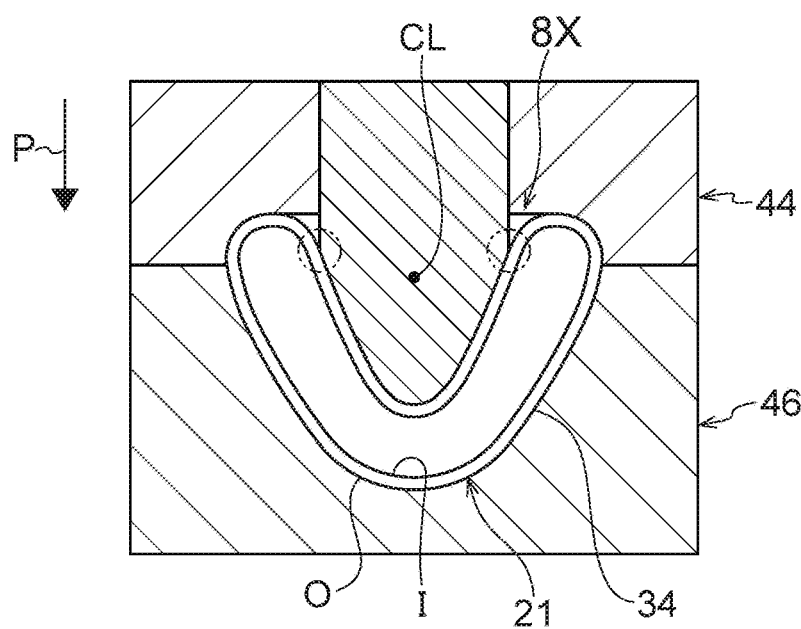
FIG. 7 is a cross-section of a die, illustrating a state in which the hollow tube illustrated in FIG. 6A has been pressed.

Next, as illustrated in FIG. 7, the moving devices 48 are actuated to lower the upper die 44. Closing the upper die 44 and the lower die 46 molds the torsion section 26 (including the first deformed section 32 and the second deformed sections 34) by deforming the hollow tube 20 from the tube outer side toward the tube inner side to form a concave profile.

Figure 8:
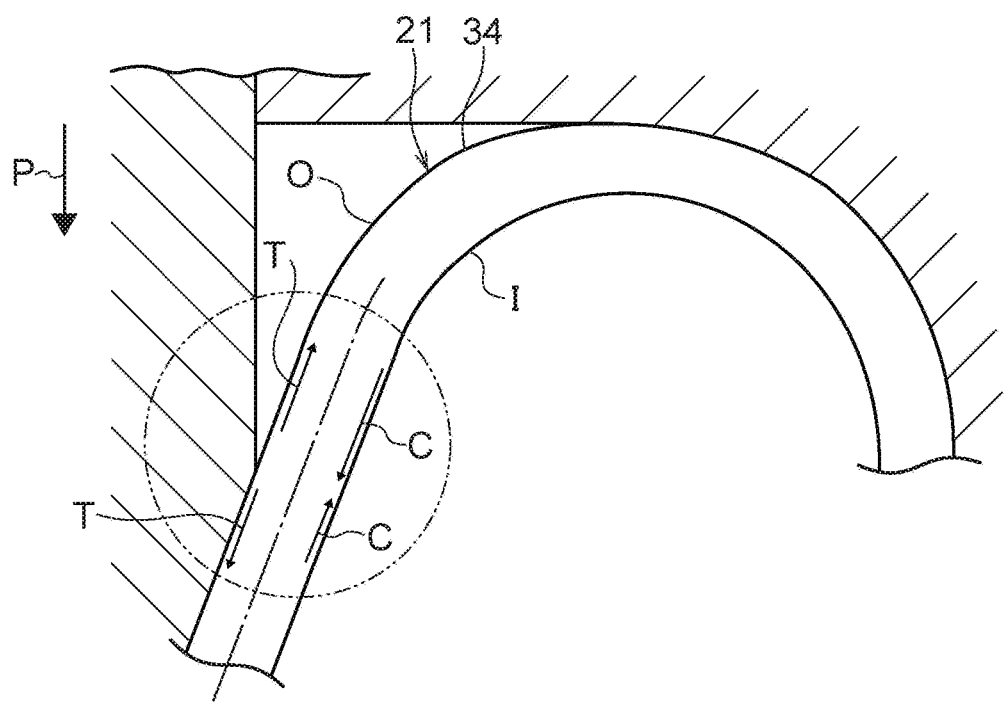
FIG. 8 is an enlarged view illustrating the portion indicated by arrow 8X in FIG. 7.

When this is performed, compressive stress C in a peripheral direction is generated at a tube inner face I of each second deformed section 34 at the circled portions in FIG. 7 and FIG. 8 (portions with high residual stress).

Figure 9:
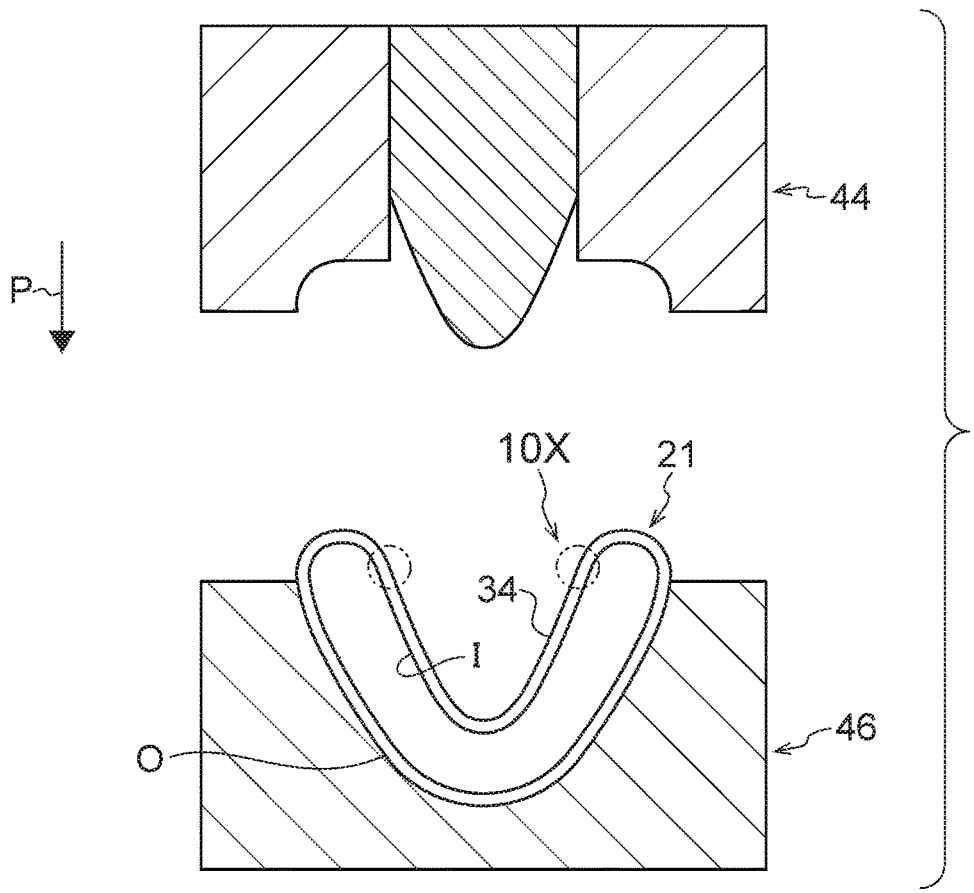
FIG. 9 is a cross-section of the die illustrated in FIG. 7, illustrating a state in which the die has been opened.
Figure 10:
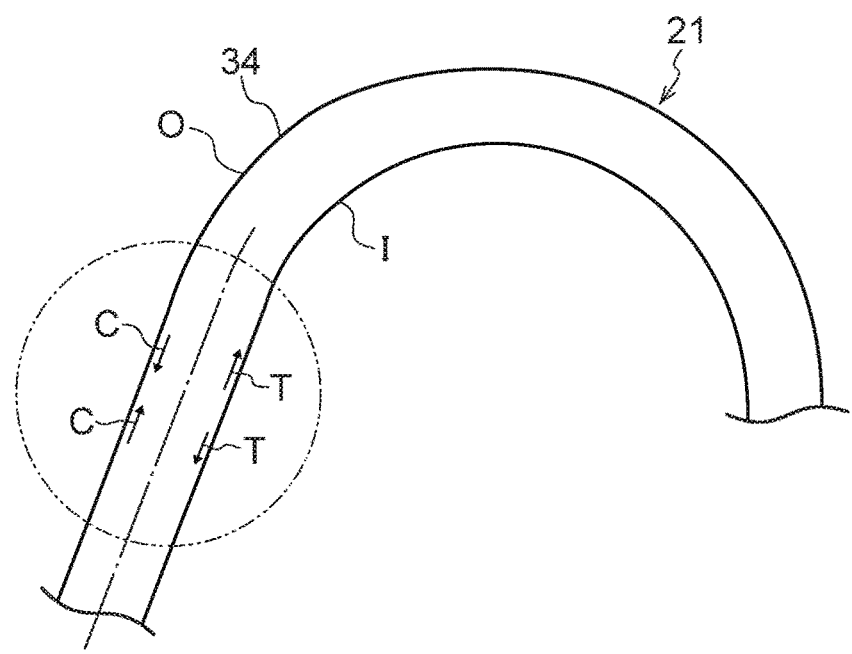
FIG. 10 is an enlarged view illustrating the portion indicated by arrow 10X in FIG. 9.

After pressing, the upper die 44 is raised as illustrated in FIG. 9. When this is performed, spring-back occurs in the pressed hollow tube 20 (intermediate molded product), and the state of stress within the portion with high residual stress changes as illustrated in FIG. 10. Namely, tensile stress T in a peripheral direction remains at the tube inner face I of the second deformed section 34.

Second Setting Process

Figure 12:
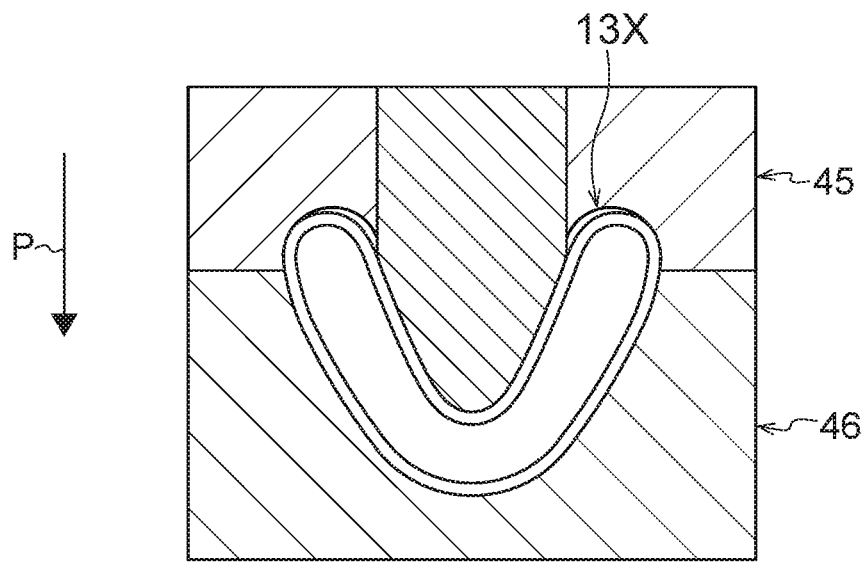
FIG. 12 is a cross-section of the die illustrated in 11, illustrating a state in which the die has been closed.

Next, as illustrated in FIG. 11, the upper die 44 is exchanged for the upper die 45, while the intermediate molded product remains in the concave portion 46A of the lower die 46. The moving devices 49 are then actuated to lower the upper die 45. The intermediate molded product 21 is thereby set in a cavity formed between the upper die 45 and the lower die 46 (see FIG. 12).

Deformation Process

Figure 14:
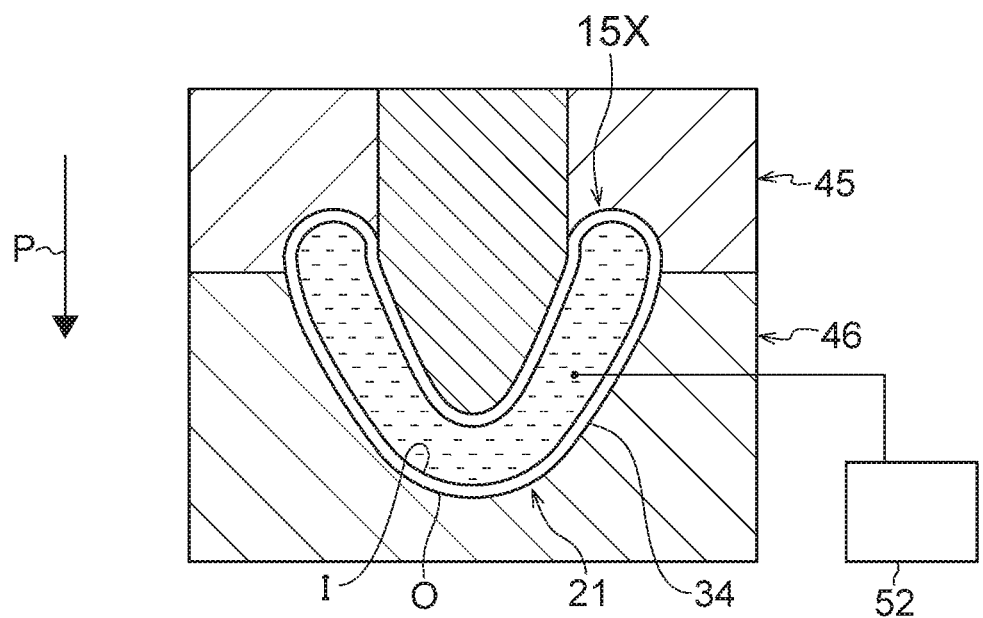
FIG. 14 is a cross-section of a die, illustrating a state in which the intermediate molded product illustrated in FIG. 12 is being compressed along an axial direction while hydraulic pressure is acting on the inside of the intermediate molded product.
Figure 15:
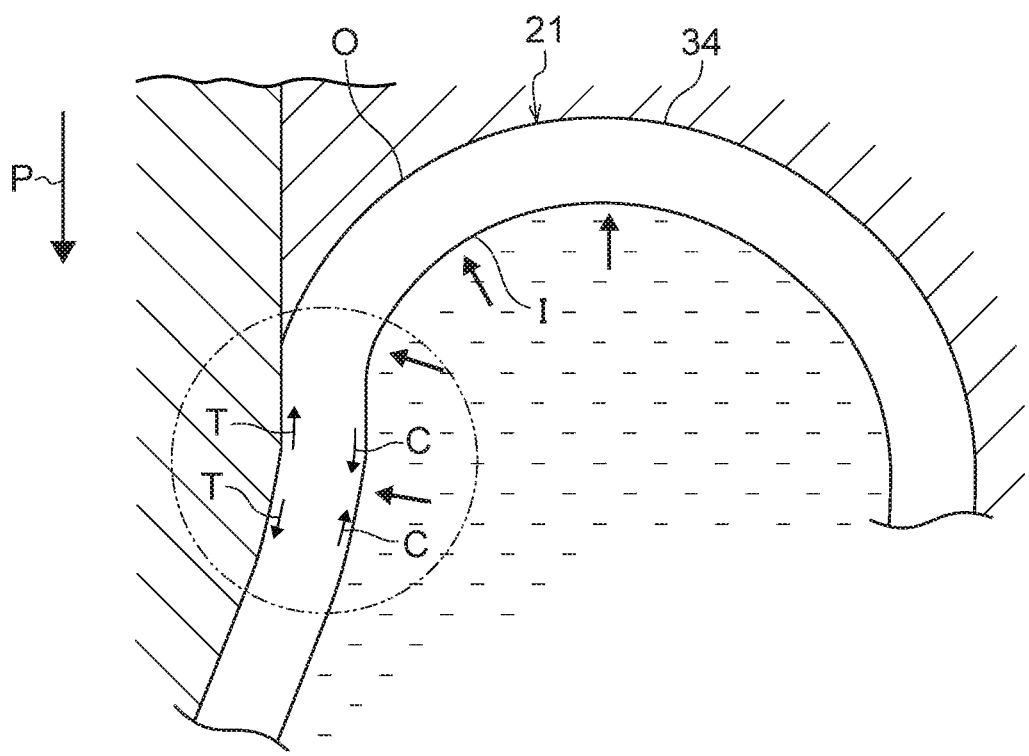
FIG. 15 is an enlarged view illustrating the portion indicated by arrow 15X in FIG. 14.

Next, as illustrated in FIG. 14 and FIG. 15, the locations with a high level of residual stress in the closed cross-section configured by the second deformed section 34 of the intermediate molded product 21 are deformed out-of-plane. Specifically, the liquid injector 52 injects liquid into the hollow portion of each tubular section 24, and the second deformed section 34 is deformed out-of-plane toward the recessed portions 45D of the upper die 45 by the pressure of the liquid. In other words, pressure (hydraulic pressure) is applied inside the closed cross-section configured by the tubular section 24 such that the locations with a high level of residual stress in the second deformed section 34, which has been deformed with a concave profile, are deformed out-of-plane.

When this is performed, the compression device 54 is used to compress the tubular sections 24 along the axial direction while the hydraulic pressure is applied to the hollow portion of the intermediate molded product 21. In other words, the compression device 54 performs axial compression on the tubular sections 24.

As described above, locations with a high level of tensile residual stress at the tube inner face I of the second deformed section 34 are deformed out-of-plane toward the opposite side to the pressing direction. Namely, these locations are bent back, enabling compressive stress to be generated at the tube inner face I of the second deformed section 34.

Figure 16:
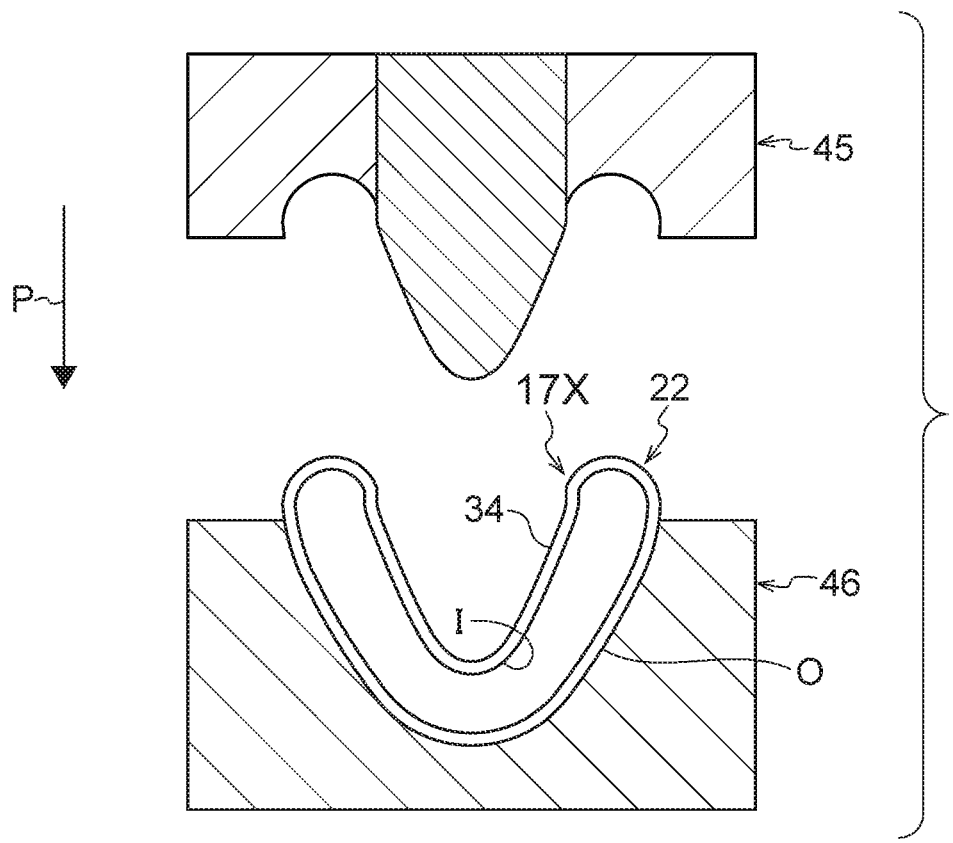
FIG. 16 is a cross-section of the die illustrated in FIG. 15, illustrating a state in which the die has been opened.

After hydroforming of the intermediate molded product has been completed, the liquid is drained from the hollow portion of the intermediate molded product 21. Actuation of the compression device 54 is also stopped. The upper die 45 is then raised as illustrated in FIG. 16.

Figure 17:
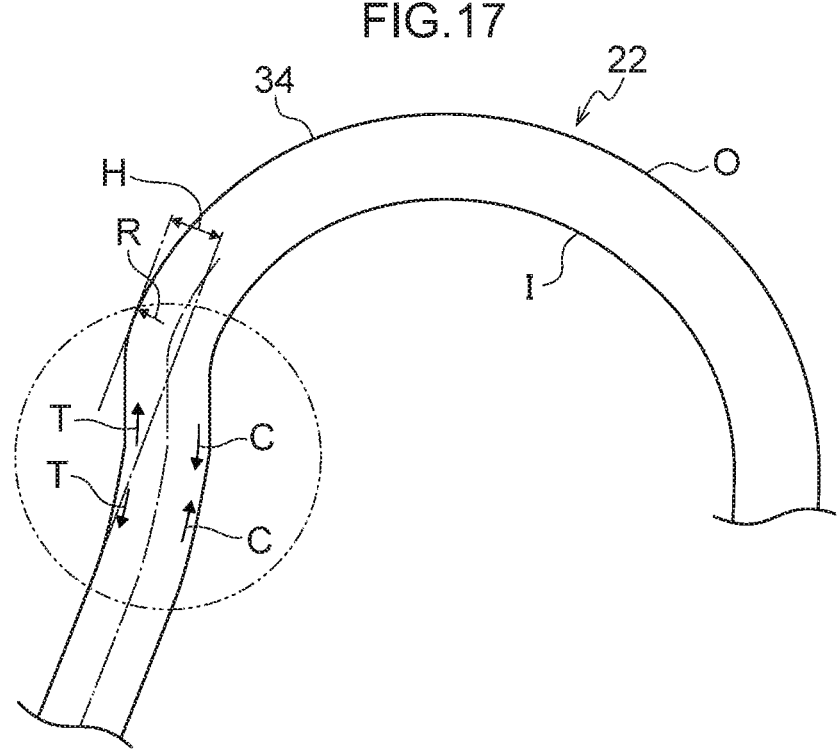
FIG. 17 is an enlarged view illustrating the portion indicated by arrow 17X in FIG. 16.

When hydroforming is complete, the plastically-formed component (torsion beam 22) springs back when the upper die 45 is raised, and a state of stress within the portions with high residual stress changes as illustrated in FIG. 17. Namely, compressive stress C in a peripheral direction remains at the tube inner face I of each second deformed section 34.

Next, explanation follows regarding operation and advantageous effects of the present exemplary embodiment.

Figure 25A:
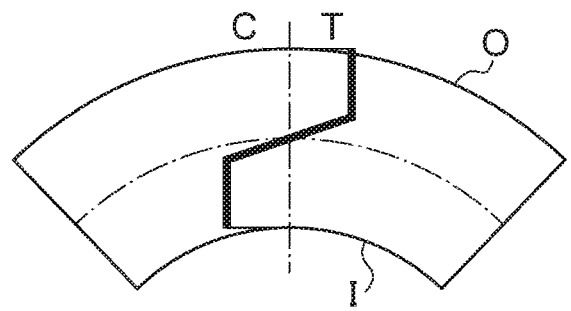
FIG. 25A is a stress distribution diagram illustrating a state of stress at a location having a high level of residual stress when a hollow tube has been pressed employing a manufacturing method of the present disclosure.
Figure 25B:
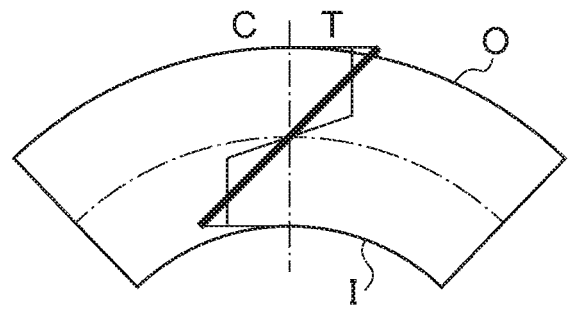
FIG. 25B is a stress distribution diagram illustrating relieved stresses at the location illustrated in FIG. 25A when stresses in the pressed hollow tube have been relieved.
Figure 25C:
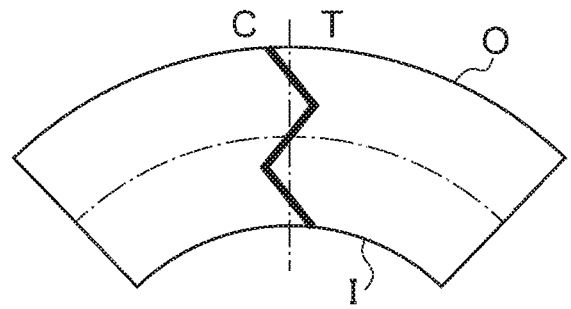
FIG. 25C is a stress distribution diagram illustrating a state of stress at the location illustrated in FIG. 25A in an intermediate molded product (pressed hollow tube) after springing back.

First, explanation follows regarding stress distribution across the thickness of automotive components that are configured from elastoplastic materials. FIG. 25A to FIG. 25C are stress distribution diagrams for a torsion beam of a Comparative Example 1, in which a hollow tube 20 is subjected to pressing only. As illustrated in FIG. 25A, during bending, tensile bending stress is generated at a tube outer face O, and compressive bending stress is generated at the tube inner face I. However, when bending load is released, spring-back occurs and stress is relieved as illustrated in FIG. 25B. After spring-back, compressive residual stress is generated at the tube outer face O, and tensile residual stress is generated at the tube inner face I, as illustrated in FIG. 25C. These stresses have values corresponding to the bending stresses in FIG. 25A minus the stress released in spring-back in FIG. 25B. This state exacerbates fatigue characteristics, as described earlier. Note that the letter C in the drawings indicates compressive stress, and the letter T in the drawings indicates tensile stress.

Figure 26A:
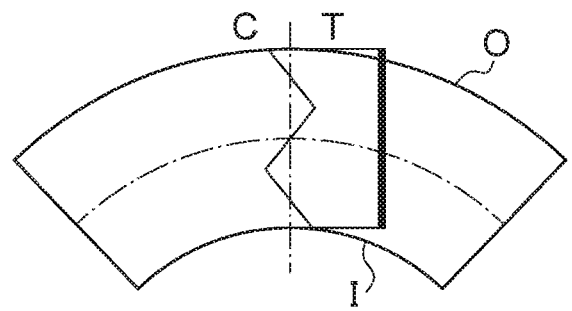
FIG. 26A is a stress distribution diagram illustrating a state of stress at a location having a high level of residual stress when molding an intermediate molded product by applying hydraulic pressure to the interior of the intermediate molded product employing a manufacturing method of a comparative example.
Figure 26B:
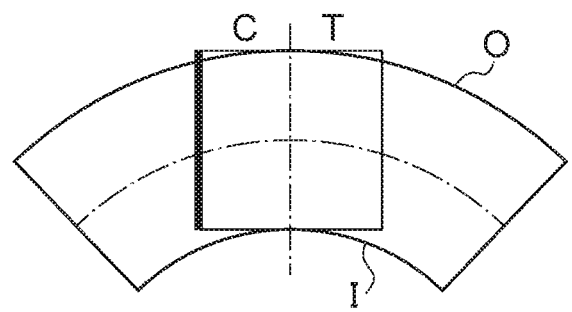
FIG. 26B is a stress distribution diagram illustrating relieved stresses at the location illustrated in FIG. 26A when the application of hydraulic pressure on the intermediate molded product has been relieved.
Figure 26C:
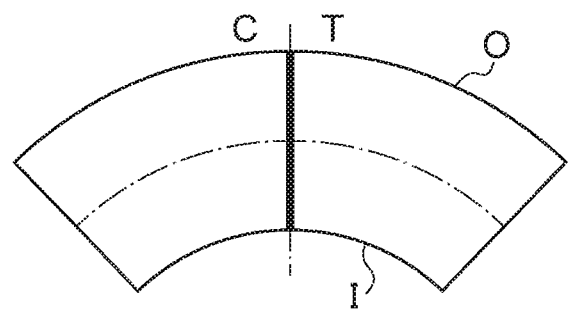
FIG. 26C is a stress distribution diagram illustrating a state of stress at the location illustrated in FIG. 26A in a completed product (torsion beam) after springing back.

For this reason, as described in JP-A No. 2013-91433, the inventors have developed technology in which tensile force is applied in a peripheral direction after a hollow tube 20 has been pressed. FIG. 26A to FIG. 26C are stress distribution diagrams for a torsion beam of a Comparative Example 2 employing the technology of JP-A No. 2013-91433. When hydraulic pressure is used to apply tensile force in a peripheral direction so as to cause deformation, as illustrated in FIG. 26A, an elastically deformed location within the thickness deforms entirely plastically, thereby reducing tensile residual stress. When the hydraulic pressure is relieved, spring-back occurs, relieving the stresses as illustrated in FIG. 26B, and after spring-back, there is no residual stress at the tube outer face O or the tube inner face I, as illustrated in FIG. 26C. The fatigue characteristics of the torsion beam are thus improved. However, in this method, it is seldom that tensile residual stress become compressive at the tube inner face I, and even if such compressive residual stress is obtained, it is in the region of −150 MPa.

Figure 27A:
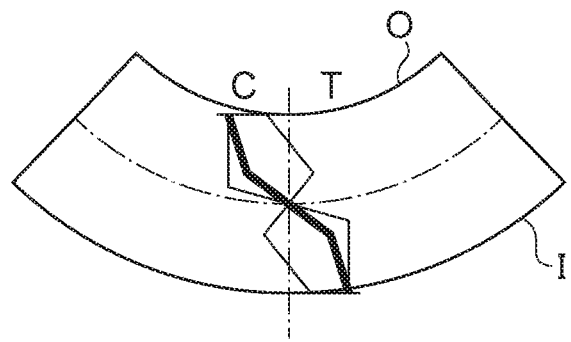
FIG. 27A is a stress distribution diagram illustrating a state of stress at a location having a high level of residual stress when molding an intermediate molded product by applying hydraulic pressure to the interior of the intermediate molded product employing a manufacturing method of the present disclosure.
Figure 27B:
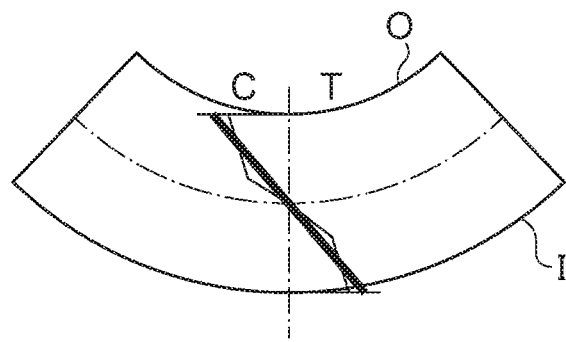
FIG. 27B is a stress distribution diagram illustrating relieved stresses at the location illustrated in FIG. 27A when the application of hydraulic pressure on the intermediate molded product has been relieved.
Figure 27C:
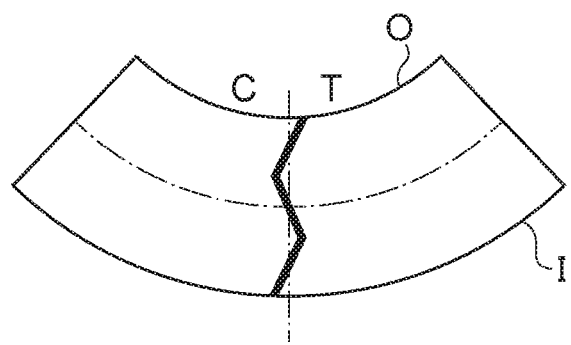
FIG. 27C is a stress distribution diagram illustrating a state of stress at the location illustrated in FIG. 27A in a completed product (torsion beam) after springing back.

By contrast, in the present exemplary embodiment, after the hollow tube 20 has been pressed, the hollow tube 20 is bent back so as to change the stresses as illustrated in FIG. 27A to FIG. 27C. Specifically, as illustrated in FIG. 27A, an elastically deformed location within the thickness deforms plastically, thereby reducing tensile residual stress. When the hydraulic pressure is relieved, spring-back occurs, relieving the stresses as illustrated in FIG. 27B, and after spring-back, compressive stress remains at the tube inner face I as illustrated in FIG. 27C. At this point, a large compressive residual stress in the region of −300 MPa can be generated at the tube inner face I. The manufacturing method of the present exemplary embodiment thereby attains a fatigue characteristic-improving effect greater than or equal to that of the Comparative Example 2.

Due to the above, in the manufacturing method of the present exemplary embodiment, the locations with high residual stress in the closed cross-section configured by each second deformed section 34 are bent back in the deformation process, thereby enabling tensile residual stress to be reduced at the tube inner face of the second deformed section 34. This thereby enables tensile residual stress at the tube inner face I of the second deformed section 34 to be reduced, improving the fatigue characteristics of the torsion beam 22, without quenching or annealing after the deformation process.

In particular, an out-of-plane deformation amount H of the out-of-plane deformed sections 28 is made large, namely, the bend-back amount is made large, such that the tensile residual stress at the tube inner face I of the second deformed section 34 is either eliminated or is converted to compressive residual stress. Converting the tensile residual stress at the tube inner face I of the second deformed section 34 to compressive residual stress improves the fatigue characteristics of the torsion beam 22.

Moreover, in the manufacturing method of the present exemplary embodiment, liquid is injected into the hollow portion of the intermediate molded product 21 from the liquid injector 52, and the hydraulic pressure is used to deform the second deformed sections 34 out-of-plane toward the recessed portions 45D of the upper die 45. This thereby enables the out-of-plane deformed sections 28 to be molded using a simpler configuration (a simpler die profile) than in cases in which the manufacturing device 40 is provided with a member to cause the second deformed sections 34 of the intermediate molded product 21 to project from the tube inner side toward the tube outer side.

Moreover, in the manufacturing method of the present exemplary embodiment, the tubular sections 24 are compressed along the axial direction by the compression device 54 while hydraulic pressure acts on the hollow portion of the intermediate molded product 21. Namely, the second deformed sections 34 can be molded into shapes following the recessed portions 45D of the upper die 45 by subjecting the tubular sections 24 to hydroforming.

In the manufacturing device 40 of the present exemplary embodiment, the pressing section 45A of the upper die 45 is capable of moving in the pressing direction. However, there is no limitation to such a configuration. The upper die 45 may be configured by a single piece. In such a configuration, the pressing device 51 may be omitted.

In the manufacturing device 40 of the present exemplary embodiment, the pressing section 44A of the upper die 44 is capable of moving in the pressing direction. However, there is no limitation to such a configuration. The upper die 45 may be configured by a single piece. In such a configuration, the pressing device 51 may be omitted.

In the manufacturing method of the present exemplary embodiment, in the deformation process, the compression device 54 is used to compress the intermediate molded product 21 along the axial direction while hydraulic pressure acts on the hollow portion of the intermediate molded product 21. However, there is no limitation to such a configuration. Configuration may be made in which the second deformed section 34 is deformed out-of-plane (bent back) toward the recessed portion 45D using a configuration that only causes hydraulic pressure to act on the hollow portion of the intermediate molded product 21.

In the present disclosure, it is sufficient that the bend-back amount of the bent-back location is sufficient to achieve a profile that plastically deforms the tube inner face, with a bend-back height being approximately half the thickness. Under such conditions, fatigue characteristics will not be exacerbated by concentration of stress or the like when loaded.

Moreover, although tensile residual stress is generated at the tube outer face of the bent-back location, a greater amount of stress is generated at the tube inner face when the torsion beam is loaded, and therefore fatigue characteristics are not exacerbated even if slight tensile residual stress is generated at the tube outer face.

Moreover, in the present disclosure, in the torsion beam 22, compressive residual stress is generated at the tube inner face I, and from the perspective of avoiding a concentration of stress when the torsion beam is loaded, the deformation amount H of each out-of-plane deformed section 28 and a radius of curvature R of the out-of-plane deformed section 28 are preferably set as follows. Note that t is the thickness of the hollow tube.

$H \le 5t$ $0.5t \le R \le 10t$ ($t$ being the thickness of the hollow tube)

More preferably, the out-of-plane deformation amount H of the out-of-plane deformed section 28 and the radius of curvature R of the out-of-plane deformed section 28 are set as follows.

$H \le t$ $2t \le R \le 5t$

Second Exemplary Embodiment

Explanation follows regarding an automotive component manufacturing method (hereafter abbreviated to "manufacturing method" as appropriate) of a second exemplary embodiment. Note that configurations similar to those of the first exemplary embodiment are allocated the same reference numerals, and explanation thereof is omitted.

First, explanation follows regarding an automotive component manufactured by the manufacturing method of the present exemplary embodiment, followed by explanation regarding a manufacturing device employed in the manufacturing method of the present exemplary embodiment. This will then be followed by explanation regarding the manufacturing method of the present exemplary embodiment.

Automotive Component

Figure 23:
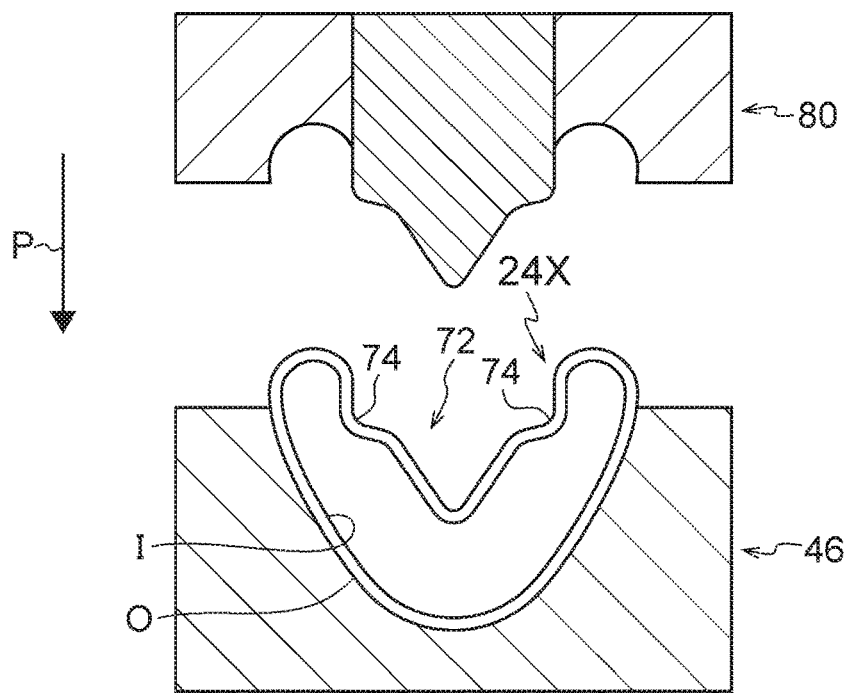
FIG. 23 is a cross-section of the die illustrated in FIG. 22, illustrating a state in which the die has been opened.
Figure 24:
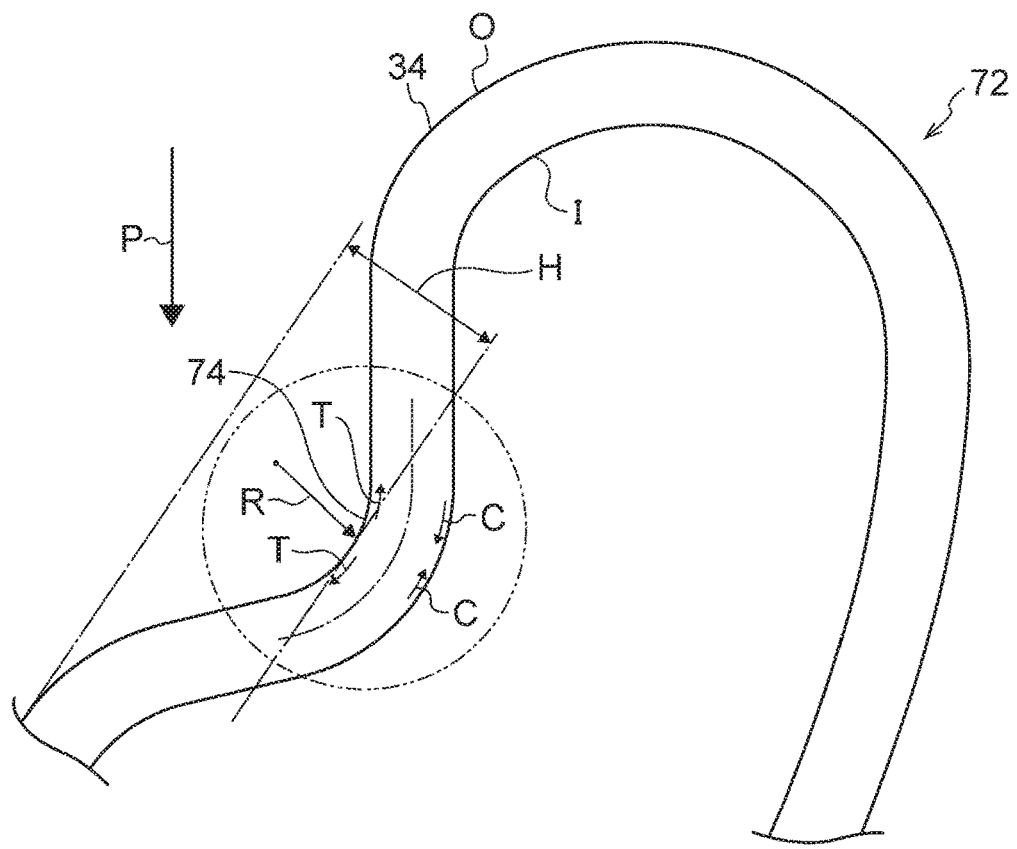
FIG. 24 is an enlarged view illustrating the portion indicated by arrow 24X in FIG. 23.

As illustrated in FIG. 23 and FIG. 24, a torsion beam 72 is configured similarly to the torsion beam 22 of the first exemplary embodiment and explanation thereof is therefore omitted, with the exception of the configuration of out-of-plane deformed sections 74 formed to the torsion section 26.

Out-Of-Plane Deformed Section 74

The out-of-plane deformed sections 74 are concave portions formed by out-of-plane deformation of the second deformed section 34, which has been deformed from the tube outer side toward the tube inner side to form a concave profile.

Automotive Component Manufacturing Device

Next, explanation follows regarding the automotive component manufacturing device of the present exemplary embodiment.

Figure 18:
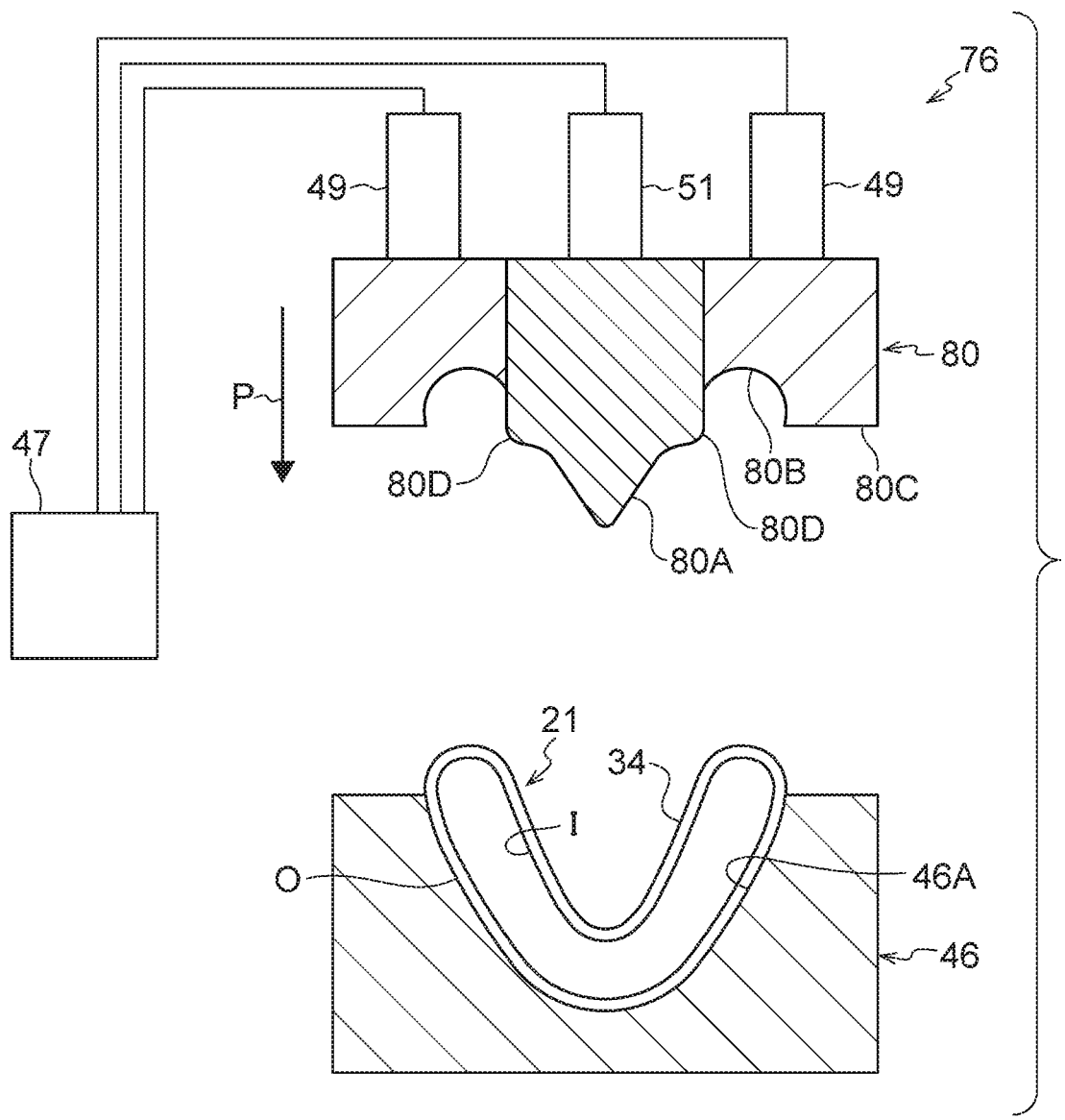
FIG. 18 is a cross-section illustrating a die of a second exemplary embodiment for hydroforming an intermediate molded product.

As illustrated in FIG. 6A and FIG. 18, a manufacturing device 76 is a device for pressing a hollow tube 20 to mold an intermediate molded product, and then hydroforming the intermediate molded product to mold the torsion beam 72. The manufacturing device 76 includes an upper die 44 and a lower die 46 that press a portion of the hollow tube 20 so as to mold an intermediate molded product 21. Note that the configurations of the upper die 44 and the lower die 46 are similar to those of the first exemplary embodiment, and so explanation thereof is omitted.

The manufacturing device 76 includes an upper die 80 that bends back the second deformed sections 34 by hydroforming so as to mold the out-of-plane deformed sections 74, described later.

The upper die 80 includes a pressing section 80A that presses and deforms a portion of the hollow tube 20 (a portion on the upper side in FIG. 18) from the tube outer side toward the tube inner side, and molded sections 80C that are each formed with a concave portion 80B for molding the opening ends of the V-shape of the torsion section 26. Note that the pressing section 80A of the upper die 80 of the present exemplary embodiment is capable of moving in the pressing direction (the arrow P direction) with respect to the molded sections 80C.

The pressing section 80A is formed with projections 80D at positions corresponding to the out-of-plane deformed sections 74 of the torsion section 26.

The manufacturing device 76 further includes moving devices 49 to move the upper die 80 and the lower die 46 relative to one another, and a pressing device 51 that moves the pressing section 80A in the pressing direction. Note that the moving devices 49 and the pressing device 51 have the same configuration as in the first exemplary embodiment, and so explanation thereof is omitted.

The manufacturing device 76 further includes a liquid injector 52 that injects liquid into a hollow portion of the intermediate molded product 21 in a state in which the tubular sections 24 are held by the upper die 80 and the lower die 46, and a compression device 54 that compresses the intermediate molded product 21 in an axial direction (what is referred to as axial compression). Note that the liquid injector 52 and the compression device 54 have the same configuration as in the first exemplary embodiment, and so explanation thereof is omitted.

Automotive Component Manufacturing Method

Next, explanation follows regarding the automotive component manufacturing method of the present exemplary embodiment.

Note that the first setting process in which the tubular section 24 of the hollow tube 20 is set in the concave portion 46A of the lower die 46 of the manufacturing device 76, and the forming process, are similar to in the first exemplary embodiment, and so explanation thereof is omitted.

Second Setting Process

Figure 19:
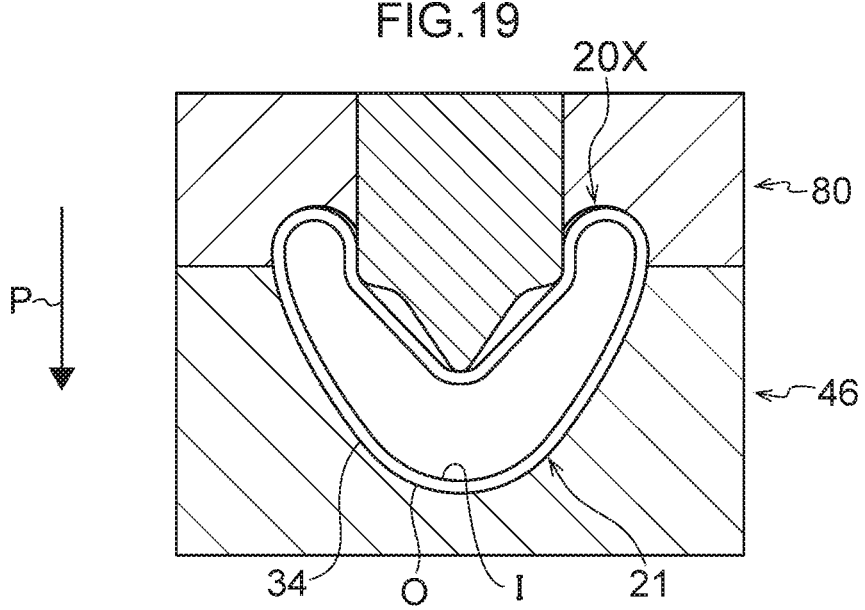
FIG. 19 is a cross-section of the die illustrated in FIG. 18, illustrating a state in which an intermediate molded product is being pressed while the die is closed.
Figure 20:
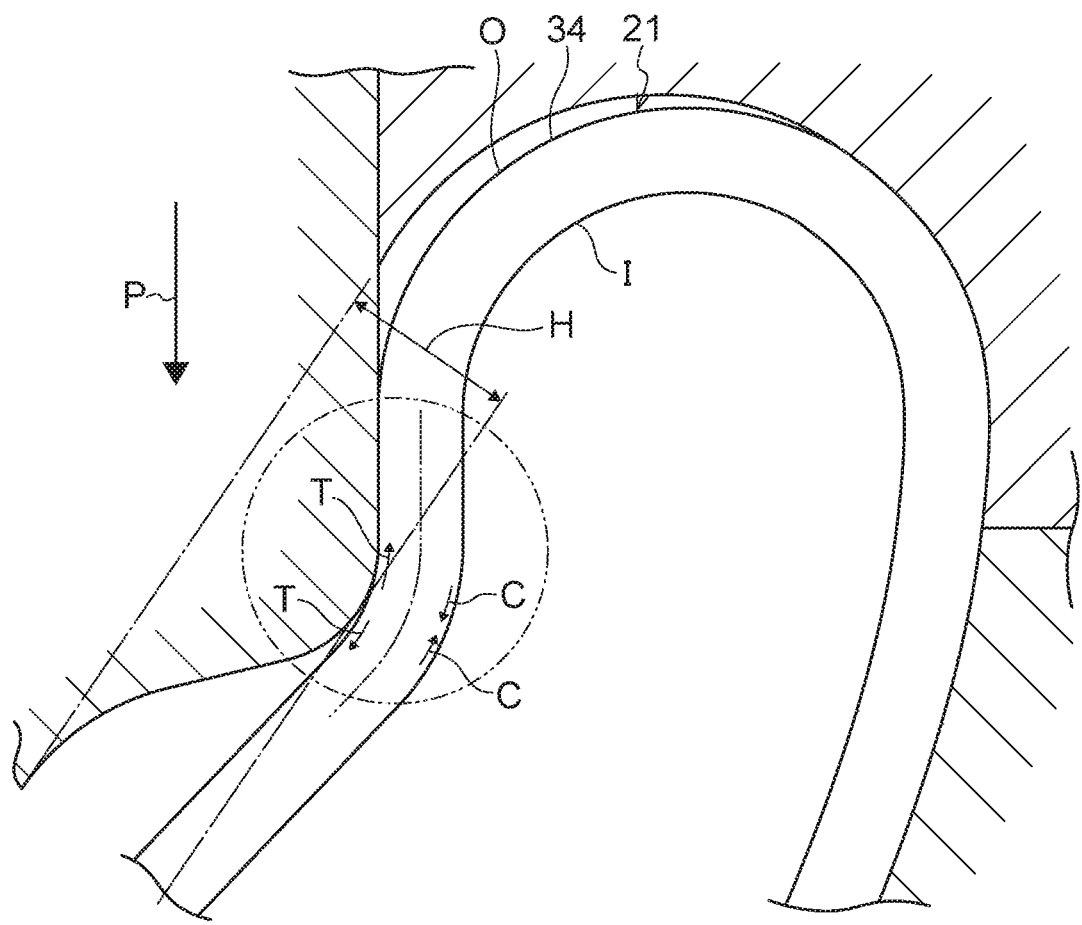
FIG. 20 is an enlarged view illustrating the portion indicated by arrow 20X in FIG. 19.

Next, as illustrated in FIG. 18, the upper die 44 is exchanged for the upper die 80, while the intermediate molded product remains in the concave portion 46A of the lower die 46. The moving devices 49 are then actuated to lower the upper die 80. The intermediate molded product is thus set in a cavity formed between the upper die 80 and the lower die 46 (see FIG. 19 and FIG. 20). When this is performed, each second deformed section 34 of the intermediate molded product 21 is pressed by the projections 80D of the pressing section 80A.

Deformation Process

Figure 21:
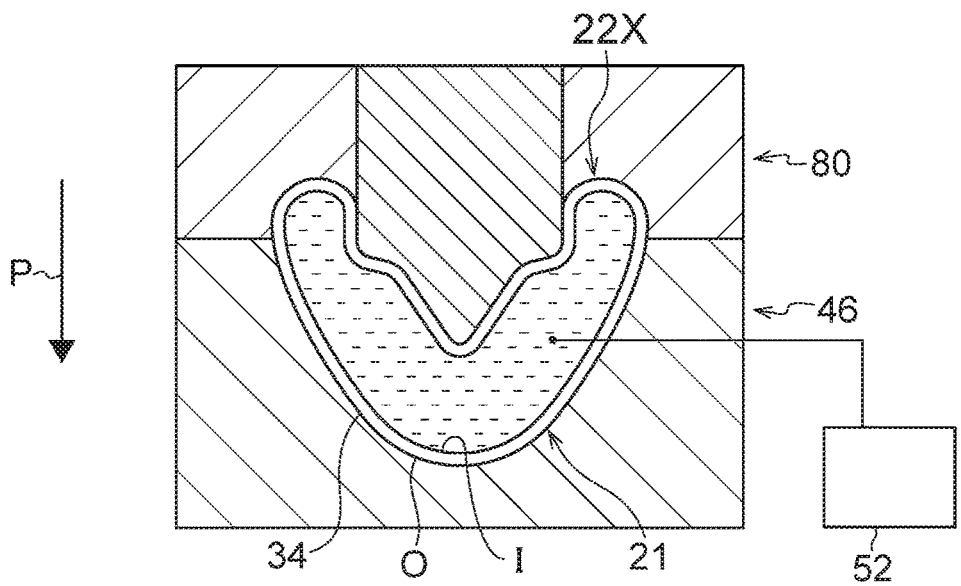
FIG. 21 is a cross-section illustrating a die, in a state in which the intermediate molded product illustrated in FIG. 20 is being compressed along an axial direction while hydraulic pressure is acting on the inside of the intermediate molded product.
Figure 22:
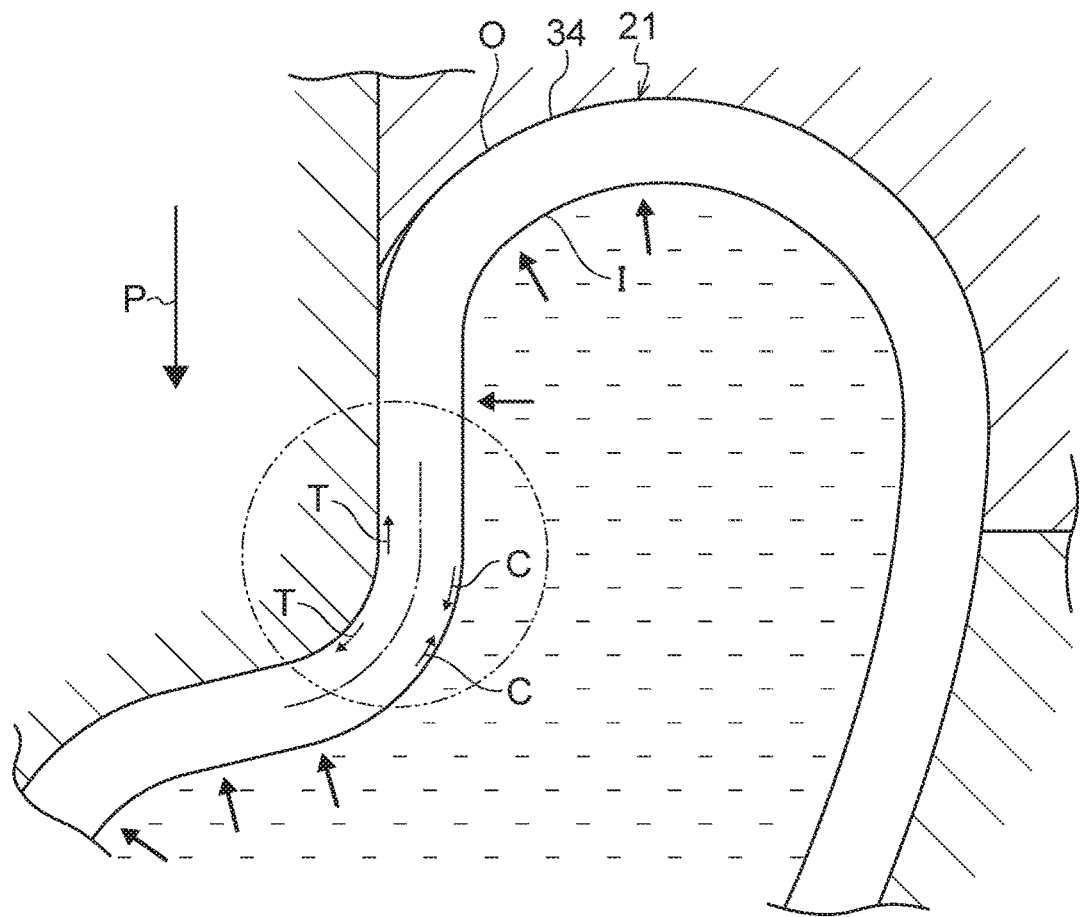
FIG. 22 is an enlarged view illustrating the portion indicated by arrow 22X in FIG. 21.

Next, as illustrated in FIG. 21 and FIG. 22, locations with a high level of residual stress in the closed cross-section configured by each second deformed section 34 of the intermediate molded product 21 are deformed out-of-plane. Specifically, the liquid injector 52 injects liquid into the hollow portion of the intermediate molded product 21, and the second deformed section 34 of the tubular section 24, which has been deformed with a concave profile, is deformed out-of-plane toward the vicinity of the projections 80D of the pressing section 80A by the pressure of the liquid. In other words, pressure (hydraulic pressure) is applied at the inside of the closed cross-section configured by the second deformed section 34 such that the locations with a high level of residual stress in the second deformed section 34 are deformed out-of-plane toward the tube inner side.

When this is performed, the compression device 54 is used to compress the intermediate molded product 21 along the axial direction while the hydraulic pressure acts on the hollow portion of the intermediate molded product 21. In other words, the compression device 54 performs axial compression on the tubular sections 24.

As described above, the locations with a high level of tensile residual stress at the tube inner face I of each second deformed section 34 are deformed out-of-plane toward the opposite side to the pressing direction. Namely, these locations are bent back, enabling tensile residual stress at the tube inner face I of the second deformed section 34 to be reduced.

After hydroforming of the intermediate molded product has been completed, the liquid is drained from the hollow portion of the intermediate molded product 21. Actuation of the compression device is also stopped. The upper die 45 is then raised as illustrated in FIG. 23.

Note that the second exemplary embodiment is capable of obtaining similar advantageous effects to those of the first exemplary embodiment, with the exception of the effect obtained by the first exemplary embodiment of enabling the die profile to be simplified.

Explanation follows regarding Examples of the present disclosure.

EXAMPLES

Figure 28:
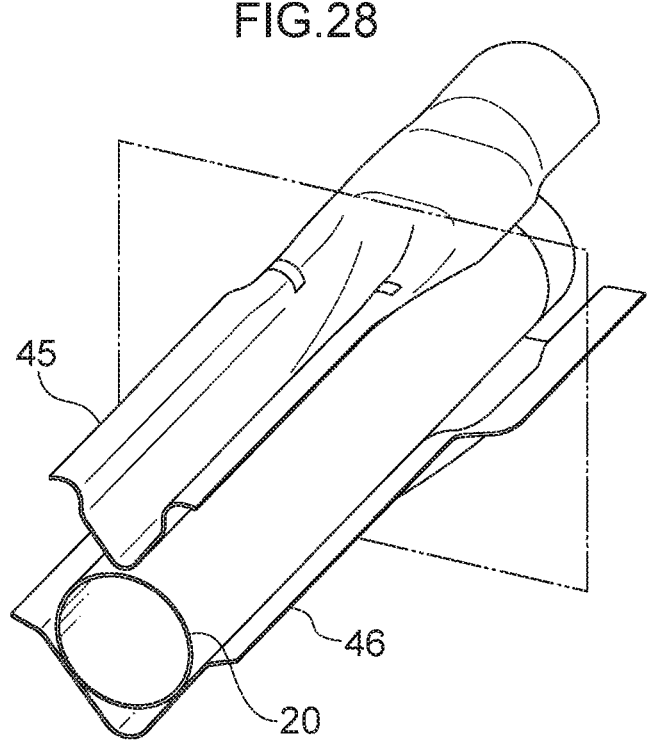
FIG. 28 is an explanatory diagram relating to an analysis model for a second deformed section of an Example 1 of the present disclosure.
Figure 29:
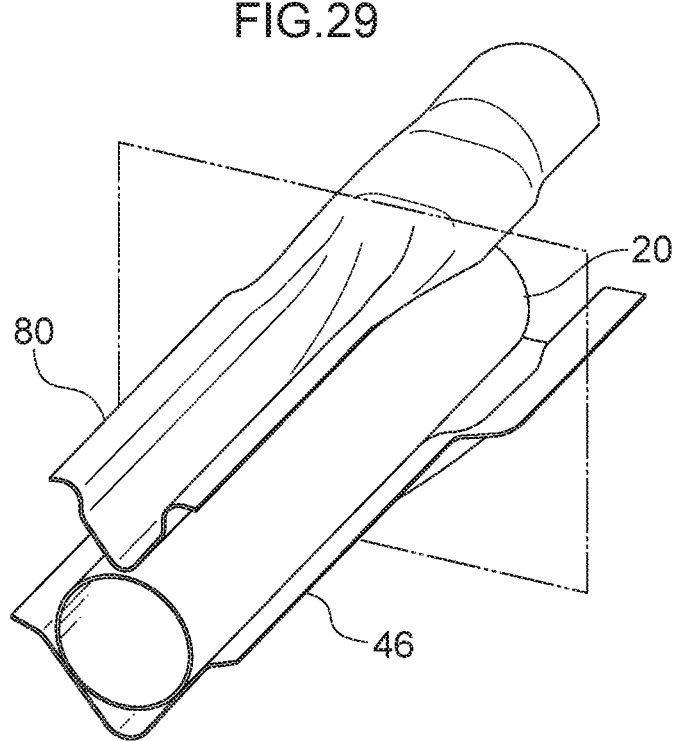
FIG. 29 is an explanatory diagram relating to an analysis model for a second deformed section of an Example 11 of the present disclosure.

A hollow tube was processed as a torsion beam using the manufacturing method of the present disclosure, employing an electric resistance welded steel tube as the hollow tube. The torsion beam was then investigated to see if it could exhibit satisfactory fatigue characteristics without heat treatment. In order to achieve satisfactory torsion beam fatigue beam fatigue strength without heat treatment. For reference purposes, FIG. 28 illustrates an analysis model for Condition 1 in Table 1, and FIG. 29 illustrates an analysis model for Condition 11.

TABLE 1

| Condition | Tensile strength (MPa) | External diameter (mm) | Thickness (mm) | Length (mm) | Out-of-plane deformed section profile | Out-of-plane deformed section height/depth Z (mm) | Out-of-plane deformed section radius of curvature R (mm) | HF internal pressure (MPa) |
|---|---|---|---|---|---|---|---|---|
| 1 | 780 | 114.3 | 2.9 | 1300 | Convex | 2.0 | 10.0 | 100 |
| 2 | 780 | 114.3 | 2.9 | 1300 | Convex | 2.0 | 10.0 | 100 |
| 3 | 780 | 114.3 | 2.9 | 1300 | Convex | 5.0 | 10.0 | 100 |
| 4 | 780 | 114.3 | 2.9 | 1300 | Convex | 2.0 | 2.0 | 100 |
| 5 | 780 | 114.3 | 2.9 | 1300 | Convex | 2.0 | 30.0 | 100 |
| 6 | 780 | 114.3 | 2.9 | 1300 | Convex | 15.0 | 10.0 | 100 |
| 7 | 780 | 114.3 | 2.9 | 1300 | Convex | 1.0 | 10.0 | 100 |
| 8 | 780 | 114.3 | 2.9 | 1300 | Concave | 2.0 | 10.0 | 120 |
| 9 | 780 | 114.3 | 2.9 | 1300 | Concave | 2.0 | 10.0 | 120 |
| 10 | 780 | 114.3 | 2.9 | 1300 | Concave | 5.0 | 10.0 | 120 |
| 11 | 780 | 114.3 | 2.9 | 1300 | Concave | 2.0 | 2.0 | 120 |
| 12 | 780 | 114.3 | 2.9 | 1300 | Concave | 2.0 | 30.0 | 120 |
| 13 | 780 | 114.3 | 2.9 | 1300 | Concave | 15.0 | 10.0 | 100 |
| 14 | 780 | 114.3 | 2.9 | 1300 | Concave | 1.0 | 10.0 | 100 |
| 15 | 780 | 114.3 | 2.9 | 1300 | — | — | — | 100 |
| 16 | 780 | 114.3 | 2.9 | 1300 | — | — | — | 100 |
| 17 | 780 | 114.3 | 2.9 | 1300 | — | — | — | 120 |
| 18 | 780 | 101.6 | 2.6 | 1250 | Convex | 2.0 | 10.0 | 85 |

| Condition | HF axial compression (mm) | Thickness reduction percentage (%) | Maximum residual stress (MPa) | Residual stress at surface layer (MPa) | Stress generated under load (MPa) | Notes |
|---|---|---|---|---|---|---|
| 1 | 10 | 3.5 | 350 | −385 | 480 | Example 1 |
| 2 | 0 | 7.0 | 370 | −360 | 420 | Example 2 |
| 3 | 10 | 6.5 | 335 | −370 | 510 | Example 3 |
| 4 | 10 | 3.5 | 365 | −335 | 585 | Example 4 |
| 5 | 10 | 3.0 | 340 | −305 | 440 | Example 5 |
| 6 | 10 | 3.0 | 340 | −310 | 650 | Example 6 |
| 7 | 10 | 2.5 | 340 | −190 | 405 | Example 7 |
| 8 | 5 | 3.0 | 330 | −360 | 470 | Example 8 |
| 9 | 0 | 3.0 | 340 | −345 | 455 | Example 9 |
| 10 | 5 | 5.0 | 385 | −325 | 520 | Example 10 |
| 11 | 5 | 4.0 | 340 | −375 | 595 | Example 11 |
| 12 | 5 | 3.5 | 355 | −350 | 470 | Example 12 |
| 13 | 10 | 3.0 | 340 | −320 | 590 | Example 13 |
| 14 | 10 | 2.5 | 325 | −175 | 400 | Example 14 |
| 15 | 0 | 3.0 | 770 | 740 | 405 | Comparative Example 1 |
| 16 | 5 | 2.5 | 375 | 165 | 415 | Comparative Example 3 |
| 17 | 10 | 3.0 | 330 | 145 | 425 | Comparative Example 2 |
| 18 | 10 | 4.0 | 320 | −325 | 410 | Example 15 | characteristics without heat treatment, residual stress of no greater than −300 MPa is required at the tube inner face.

Tube stocks (hollow tubes) such as those listed in Table 1 were processed to form torsion beams under plural processing conditions, and a thickness reduction percentage, maximum residual stress, surface layer residual stress, and stress generated under load were checked for a location having a high level of residual stress on each torsion beam. As demonstrated in Table 1, the results for each of the Examples of the present disclosure indicated a reduction in maximum residual stress when compared to comparative examples, and surface layer residual stress of less than −300 MPa. The thickness reduction percentages and stress generated under load were substantially equivalent. It is clear from the above that the present disclosure achieves satisfactory torsion Note that if setting is made such that 0.5t≤H≤5t, t≤R≤10t (t being the thickness of the hollow tube), compressive residual stress can be reliably imparted to the surface layer, and residual stress can be reduced without an increase in the stress generated under load. Such settings are thus preferable in order to improve fatigue characteristics.

As described above, the automotive component manufacturing method of the present disclosure using a hollow tube enables the manufacture of an automotive component with improved fatigue characteristics without requiring quenching or annealing after molding, and is well-suited for application to automotive torsion beams and the like. Note that the automotive component manufacturing method of the present disclosure is not limited to a manufacturing method for a torsion beam, and may obviously be applied to a broad range of automotive components other than torsion beams.

The following Supplements is also disclosed in relation to the above exemplary embodiments.

Supplement 1

An automotive component manufacturing method, including:

a molding process of pressing a portion of a hollow tube formed from a metal material, or a composite material including a metal and a resin, so as to deform the portion of the hollow tube, from a tube outer side toward a tube inner side, to beyond an axial center of the hollow tube, and mold the portion of the hollow tube into a deformed section deformed with a concave profile; and a deformation process of deforming a location having a high level of residual stress in a closed cross-section configured by the deformed section so as to deform the location out-of-plane.

Supplement 2

The automotive component manufacturing method of claim 1, wherein, in the deformation process, pressure is applied inside the closed cross-section configured by the deformed section so as to deform the location having a high level of residual stress out-of-plane toward the tube outer side.

Supplement 3

The automotive component manufacturing method of claim 2, wherein, in the deformation process, the hollow tube is compressed along an axial direction thereof while applying pressure inside the closed cross-section configured by the deformed section.

Supplement 4

The automotive component manufacturing method of claim 1, wherein, in the deformation process, the location having a high level of residual stress in the closed cross-section configured by the deformed section is pushed from the tube outer side so as to deform the location out-of-plane toward the tube inner side.

Supplement 5

The automotive component manufacturing method of claim 4, wherein, in the deformation process, the hollow tube is compressed along an axial direction thereof while pushing, toward the tube inner side, the location having a high level of residual stress in the closed cross-section configured by the deformed section.

Supplement 6

The automotive component manufacturing method of any one of claim 1 to claim 5, wherein, when an amount by which the location having a high level of residual stress in the closed cross-section configured by the deformed section is deformed out-of-plane is denoted H, a radius of curvature of a portion deformed out-of-plane is denoted R, and a thickness of the hollow tube is denoted t, the following relationships are satisfied:

$0.5t \leq H \leq 5t$, and $t \leq R \leq 10t$.

Supplement 7

The automotive component manufacturing method of any one of claim 1 to claim 6, wherein:

the deformed section includes a first deformed section at which a portion of the hollow tube is deformed beyond the axial center of the hollow tube by pressing the portion of the hollow tube from the tube outer side toward the tube inner side, and a second deformed section linking the first deformed section to another portion of the hollow tube and having a deformation amount that gradually changes from the other portion toward the first deformed section; and in the deformation process, a location having a high level of the residual stress in a closed cross-section configured by the second deformed section is deformed out-of-plane.

Supplement 8

The automotive component manufacturing method of claim 7, wherein the hollow tube is processed as a torsion beam employed in a suspension unit of a vehicle, the torsion beam having a V-shaped, U-shaped, or C-shaped closed cross-section configured by the first deformed section.

Supplement 9

An automotive component, including:

a tubular section formed by a metal material or a composite material including a metal and a resin;

a deformed section including:
a first deformed section provided at one axial direction side of the tubular section, wherein a portion of a peripheral wall is deformed with respect to the tubular section beyond an axial center of the tubular section from a tube outer side toward a tube inner side so as to mold the portion of the peripheral wall into a concave profile, and
a second deformed section linking the tubular section to the first deformed section and having a deformation amount that gradually changes from the tubular section toward the first deformed section; and out-of-plane deformed sections that are each formed with a convex profile or a concave profile at mutually opposing portions in a closed cross-section of the second deformed section orthogonal to an axial direction of the tubular section.

Supplement 10

The automotive component of claim 9, wherein the automotive component is a torsion beam employed in a suspension unit of a vehicle, the torsion beam having a V-shaped, U-shaped, or C-shaped closed cross-section configured by the first deformed section.

Supplement 11

An automotive component manufacturing method in which an automotive component is molded by displacing a hollow tube configured by a metal material or a composite material including a metal and a resin from an outer side toward an inner side, the manufacturing method including:

molding a molded section at which a tubular section of the hollow tube is displaced from the outer side toward the inner side; and deforming a location having a high level of residual stress in a closed cross-section configured by the molded section out-of-plane in an opposite direction so as to reduce residual stress in the molded section.

Supplement 12

The automotive component manufacturing method of Supplement 11, wherein a gap is provided at the outer side of a target location having a high level of the residual stress, and pressure is applied at the inner side of the closed cross-section configured by the molded section so as to deform the molded section out-of-plane.

Supplement 13

The automotive component manufacturing method of Supplement 11, wherein a gap is provided at the outer side of a target location having a high level of the residual stress, and material of the molded section is axially compressed from a tube end of the molded section while applying pressure at the inner side of the closed cross-section configured by the molded section so as to deform the molded section out-of-plane.

Supplement 14

The automotive component manufacturing method of Supplement 11, wherein a target location having a high level of the residual stress is pushed toward the inner side and pressure is applied at the inner side of the closed cross-section configured by the molded section so as to deform the molded section out-of-plane.

Supplement 15

The automotive component manufacturing method of Supplement 11, wherein material of the molded section is axially compressed from a tube end of the molded section while pushing a target location having a high level of the residual stress toward the inner side applying pressure at the inner side of the closed cross-section configured by the molded section so as to deform the molded section out-of-plane.

Supplement 16

The automotive component manufacturing method of any one of Supplement 11 to Supplement 15, wherein the automotive component configured from the hollow tube is a torsion beam that couples together left and right arms of a suspension unit and that has a V-shaped or U-shaped closed cross-section as a cross-section orthogonal to a width direction of a vehicle body.

In such a configuration, a gap may be provided at the outer side of the V-shaped or U-shaped closed cross-section configuring a target for fatigue strength improvement, and pressure may be applied at the inner side of the closed cross-section so as to deform a location having a high level of residual stress in the V-shaped or U-shaped closed cross-section out-of-plane in an opposite direction. Moreover, a gap may be provided at the outer side of the V-shaped or U-shaped closed cross-section configuring a target for fatigue strength improvement, and material of the molded section may be axially compressed from a tube end while applying pressure at the inner side of the closed cross-section so as to apply tensile stress in a peripheral direction in the V-shaped or U-shaped closed cross-section.

Supplement 17

The automotive component manufacturing method of Supplement 16, wherein a gap is provided at the outer side of the V-shaped or U-shaped closed cross-section configuring a target for fatigue strength improvement, and pressure is applied at the inner side of the closed cross-section so as to deform a location having a high level of residual stress out-of-plane in an opposite direction in the V-shaped or U-shaped closed cross-section.

Supplement 18

The automotive component manufacturing method of Supplement 16, wherein a gap is provided at the outer side of the V-shaped or U-shaped closed cross-section configuring a target for fatigue strength improvement, and material of the molded section is axially compressed from a tube end of the molded section while applying pressure at the inner side of the closed cross-section so as to apply tensile stress in a peripheral direction in the V-shaped or U-shaped closed cross-section.

Supplement 19

The automotive component manufacturing method of Supplement 16, wherein the V-shaped or U-shaped closed cross-section configuring a target for fatigue strength improvement is pushed toward the inner side and pressure is applied at the inner side of the closed cross-section configured by the molded section so as to deform a location having a high level of residual stress out-of-plane in an opposite direction in the V-shaped or shaped closed cross-section.

Supplement 20

The automotive component manufacturing method of Supplement 16, wherein the V-shaped or U-shaped closed cross-section configuring a target for fatigue strength improvement is pushed toward the inner side, and material of the molded section is axially compressed from a tube end of the molded section while applying pressure at the inner side of the closed cross-section so as to apply tensile stress in a peripheral direction in the V-shaped or U-shaped closed cross-section.

The automotive component manufacturing method of Supplement 11 to Supplement 20 is capable of reducing peripheral direction tensile residual stress (compressive/tensile stress) distributed in a thickness direction of the molded section. This thereby enables the fatigue strength of the product to be improved as a result. Moreover, a large compressive residual stress can be generated at a tube inner face, thereby enabling a further improvement in fatigue strength. In particular, fatigue characteristics can be improved by applying the present disclosure to a manufacturing method for a torsion beam.

The disclosure of Japanese Patent Application No. 2016-046898, filed on Mar. 10, 2016, is incorporated in its entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. An automotive component manufacturing method, comprising:

pressing a portion of a hollow tube formed from a metal material, or a composite material including a metal and a resin, so as to deform the portion of the hollow tube, from a tube outer side toward a tube inner side, to beyond an axial center of the hollow tube, and mold the portion of the hollow tube into a deformed section deformed with a concave profile; and deforming mutually opposing portions in a vicinity of ends of an opening of the concave profile in a closed cross-section configured by the deformed section so as to deform the mutually opposing portions out-of-plane in the opening of the concave profile.

2. The automotive component manufacturing method of claim 1, wherein, in the deforming, pressure is applied inside the closed cross-section configured by the deformed section so as to deform the mutually opposing portions out-of-plane toward the tube outer side.

3. The automotive component manufacturing method of claim 2, wherein, in the deforming, the hollow tube is compressed along an axial direction thereof while applying pressure inside the closed cross-section configured by the deformed section.

4. The automotive component manufacturing method of claim 1, wherein, in the deforming, the mutually opposing portions in the closed cross-section configured by the deformed section are pushed from the tube outer side so as to deform the mutually opposing portions out-of-plane toward the tube inner side.

5. The automotive component manufacturing method of claim 4, wherein, in the deforming, the hollow tube is compressed along an axial direction thereof while pushing, toward the tube inner side, the mutually opposing portions in the closed cross-section configured by the deformed section.

6. The automotive component manufacturing method of claim 1, wherein, when an amount by which the mutually opposing portions in the closed cross-section configured by the deformed section are deformed out-of-plane is denoted H, a radius of curvature of a portion deformed out-of-plane is denoted R, and a thickness of the hollow tube is denoted t, the following relationships are satisfied:

$0.5t \leq H \leq 5t$, and $t \leq R \leq 10t$.

7. The automotive component manufacturing method of claim 1, wherein:
the deformed section includes a first deformed section at which a portion of the hollow tube is deformed beyond the axial center of the hollow tube by pressing the portion of the hollow tube from the tube outer side toward the tube inner side, and a second deformed section linking the first deformed section to another portion of the hollow tube and having a deformation amount that gradually changes from the another portion toward the first deformed section; and
in the deforming, mutually opposing portions in a closed cross-section configured by the second deformed section are deformed out-of-plane.

8. The automotive component manufacturing method of claim 7, wherein the hollow tube is processed as a torsion beam employed in a suspension unit of a vehicle, the torsion beam having a V-shaped, U-shaped, or C-shaped closed cross-section configured by the first deformed section.

9. An automotive component, comprising:
a tubular section formed by a metal material or a composite material including a metal and a resin;
a deformed section including:
a first deformed section provided at one axial direction side of the tubular section, wherein a portion of a peripheral wall is deformed with respect to the tubular section beyond an axial center of the tubular section from a tube outer side toward a tube inner side so as to mold the portion of the peripheral wall into a concave profile, and
a second deformed section linking the tubular section to the first deformed section and having a deformation amount that gradually changes from the tubular section toward the first deformed section; and
out-of-plane deformed sections that are each formed with a convex profile or a concave profile at mutually opposing portions in a vicinity of ends of an opening of the concave profile in a closed cross-section of the second deformed section orthogonal to an axial direction of the tubular section.

10. The automotive component of claim 9, wherein the automotive component is a torsion beam employed in a suspension unit of a vehicle, the torsion beam having a V-shaped, U-shaped, or C-shaped closed cross-section configured by the first deformed section.

11. The automotive component manufacturing method of claim 2, wherein, when an amount by which the mutually opposing portions in the closed cross-section configured by the deformed section are deformed out-of-plane is denoted H, a radius of curvature of a portion deformed out-of-plane is denoted R, and a thickness of the hollow tube is denoted t, the following relationships are satisfied:

$0.5t \leq H \leq 5t$, and $t \leq R \leq 10t$.

12. The automotive component manufacturing method of claim 3, wherein, when an amount by which the mutually opposing portions in the closed cross-section configured by the deformed section are deformed out-of-plane is denoted H, a radius of curvature of a portion deformed out-of-plane is denoted R, and a thickness of the hollow tube is denoted t, the following relationships are satisfied:

$0.5t \leq H \leq 5t$, and $t \leq R \leq 10t$.

13. The automotive component manufacturing method of claim 4, wherein, when an amount by which the mutually opposing portions in the closed cross-section configured by the deformed section are deformed out-of-plane is denoted H, a radius of curvature of a portion deformed out-of-plane is denoted R, and a thickness of the hollow tube is denoted t, the following relationships are satisfied:

$0.5t \leq H \leq 5t$, and $t \leq R \leq 10t$.

14. The automotive component manufacturing method of claim 5, wherein, when an amount by which the mutually opposing portions in the closed cross-section configured by the deformed section are deformed out-of-plane is denoted H, a radius of curvature of a portion deformed out-of-plane is denoted R, and a thickness of the hollow tube is denoted t, the following relationships are satisfied:

$0.5t \leq H \leq 5t$, and $t \leq R \leq 10t$.

15. The automotive component manufacturing method of claim 2, wherein:
the deformed section includes a first deformed section at which a portion of the hollow tube is deformed beyond the axial center of the hollow tube by pressing the portion of the hollow tube from the tube outer side toward the tube inner side, and a second deformed section linking the first deformed section to another portion of the hollow tube and having a deformation amount that gradually changes from the another portion toward the first deformed section; and
in the deforming, mutually opposing portions in a closed cross-section configured by the second deformed section are deformed out-of-plane.

16. The automotive component manufacturing method of claim 3, wherein:
the deformed section includes a first deformed section at which a portion of the hollow tube is deformed beyond the axial center of the hollow tube by pressing the portion of the hollow tube from the tube outer side toward the tube inner side, and a second deformed section linking the first deformed section to another portion of the hollow tube and having a deformation amount that gradually changes from the another portion toward the first deformed section; and
in the deforming, mutually opposing portions in a closed cross-section configured by the second deformed section are deformed out-of-plane.

17. The automotive component manufacturing method of claim 4, wherein:
the deformed section includes a first deformed section at which a portion of the hollow tube is deformed beyond the axial center of the hollow tube by pressing the portion of the hollow tube from the tube outer side toward the tube inner side, and a second deformed section linking the first deformed section to another portion of the hollow tube and having a deformation amount that gradually changes from the another portion toward the first deformed section; and in the deforming, mutually opposing portions in a closed cross-section configured by the second deformed section are deformed out-of-plane.

18. The automotive component manufacturing method of claim 5, wherein:

the deformed section includes a first deformed section at which a portion of the hollow tube is deformed beyond the axial center of the hollow tube by pressing the portion of the hollow tube from the tube outer side toward the tube inner side, and a second deformed section linking the first deformed section to another portion of the hollow tube and having a deformation amount that gradually changes from the another portion toward the first deformed section; and in the deforming, mutually opposing portions in a closed cross-section configured by the second deformed section are deformed out-of-plane.

19. The automotive component manufacturing method of claim 6, wherein:

the deformed section includes a first deformed section at which a portion of the hollow tube is deformed beyond the axial center of the hollow tube by pressing the portion of the hollow tube from the tube outer side toward the tube inner side, and a second deformed section linking the first deformed section to another portion of the hollow tube and having a deformation amount that gradually changes from the another portion toward the first deformed section; and in the deforming, mutually opposing portions in a closed cross-section configured by the second deformed section are deformed out-of-plane.

20. The automotive component manufacturing method of claim 11, wherein:

the deformed section includes a first deformed section at which a portion of the hollow tube is deformed beyond the axial center of the hollow tube by pressing the portion of the hollow tube from the tube outer side toward the tube inner side, and a second deformed section linking the first deformed section to another portion of the hollow tube and having a deformation amount that gradually changes from the another portion toward the first deformed section; and in the deforming, mutually opposing portions in a closed cross-section configured by the second deformed section are deformed out-of-plane.

* * * * *